(12) United States Patent
Wang et al.

(10) Patent No.: US 10,532,915 B2
(45) Date of Patent: Jan. 14, 2020

(54) AUTOMATIC CONTINUOUS OPERATION ROBOT FOR LAYING LARGE-DIAMETER PIPELINES AND OPERATING METHOD THEREFOR

(71) Applicant: TIANJIN AMJOY TECHNOLOGY CO., LTD., Tianjin (CN)

(72) Inventors: Chunhai Wang, Tianjin (CN); Zixi Wang, Tianjin (CN); Fang Liu, Tianjin (CN); Yixi Wang, Tianjin (CN)

(73) Assignee: TIANJIN AMJOY TECHNOLOGY CO., LTD., Tianjin (CN)

( * ) Notice: Subject to any disclaimer, the term of this patent is extended or adjusted under 35 U.S.C. 154(b) by 5 days.

(21) Appl. No.: 15/779,512

(22) PCT Filed: Nov. 25, 2016

(86) PCT No.: PCT/CN2016/107366
§ 371 (c)(1),
(2) Date: May 25, 2018

(87) PCT Pub. No.: WO2017/088831
PCT Pub. Date: Jun. 1, 2017

(65) Prior Publication Data
US 2018/0347723 A1    Dec. 6, 2018

(30) Foreign Application Priority Data

Nov. 26, 2015 (CN) .......................... 2015 1 0843624

(51) Int. Cl.
*F16L 1/00* (2006.01)
*F16L 1/036* (2006.01)
(Continued)

(52) U.S. Cl.
CPC ................ *B66C 1/68* (2013.01); *B23K 15/06* (2013.01); *B23K 31/02* (2013.01); *B66C 1/425* (2013.01); *F16L 1/10* (2013.01)

(58) Field of Classification Search
CPC ... F16L 1/065; F16L 1/028; F16L 1/10; F16L 1/036; F16L 1/09; F16L 1/26; F16L 3/18;
(Continued)

(56) References Cited

U.S. PATENT DOCUMENTS

| 1,877,975 A * | 9/1932 | Robb ...................... F16L 1/032 |
| | | 414/745.5 |
| 3,204,417 A * | 9/1965 | Robley ..................... F16L 1/26 |
| | | 405/170 |

(Continued)

*Primary Examiner* — Gregory W Adams
(74) *Attorney, Agent, or Firm* — Li & Cai Intellectual Property (USA) Office

(57) ABSTRACT

Disclosed are an automatic continuous operation robot for laying large-diameter pipelines and an operating method therefor. The operation robot comprises a platform, a main frame (1), an operation room, a navigation subsystem (1002), a pipe grabbing and conveying subsystem (3), a pipe end face pre-treatment subsystem (4), an on-line measurement subsystem, a pipe supporting subsystem, a welding and welding quality inspection subsystem (5), and a control system. The operating method comprises: first detecting and grabbing a pipe, then performing groove machining on the pipe, fitting the welding end faces of the current pipe and a previous pipe, then putting down the pipe, finely adjusting and fixedly connecting the two pipes, and finally, welding the two pipes. The automatic continuous operation robot for laying large-diameter pipelines has a high degree of automation and high working efficiency, and the laying period is short.

24 Claims, 18 Drawing Sheets

(51) Int. Cl.
*F16L 1/14* (2006.01)
*F16L 1/23* (2006.01)
*B66C 1/68* (2006.01)
*B23K 15/06* (2006.01)
*B23K 31/02* (2006.01)
*B66C 1/42* (2006.01)
*F16L 1/10* (2006.01)

(58) Field of Classification Search
CPC ........ B23K 15/02; B23K 15/06; B23K 31/02; B23K 37/0217; B23K 37/0276; B23K 37/047; B23K 37/053; B23K 2101/06; B23K 2101/10; B23K 37/0533; B66C 1/425; B66C 1/68; B66C 23/44; B65H 75/425
See application file for complete search history.

(56) References Cited

U.S. PATENT DOCUMENTS

| | | | | |
|---|---|---|---|---|
| 4,014,180 A | * | 3/1977 | Kelly | F16L 1/26 405/170 |
| 4,218,158 A | * | 8/1980 | Tesson | F16L 1/26 405/170 |
| 4,286,914 A | * | 9/1981 | Davidson, Jr. | F16L 1/065 405/170 |
| 4,304,505 A | * | 12/1981 | Silvestri | F16L 1/26 405/170 |
| 4,362,435 A | * | 12/1982 | Henry | F16L 1/036 294/103.1 |
| 4,433,952 A | * | 2/1984 | Glickman | B66C 19/00 180/9.46 |
| 4,452,550 A | * | 6/1984 | Hofmeester | F16L 1/032 405/158 |
| 4,579,480 A | * | 4/1986 | Szabo | E21B 43/013 405/169 |
| 4,936,707 A | * | 6/1990 | Shishkin | E02F 5/101 285/235 |
| 6,129,486 A | * | 10/2000 | Putnam | E21B 19/00 254/29 R |
| 7,607,863 B2 | * | 10/2009 | Paull | E02F 5/12 405/174 |
| 8,642,914 B2 | * | 2/2014 | Dupont | B23K 9/0286 219/59.1 |
| 8,834,068 B2 | * | 9/2014 | Lazzarin | E02F 5/006 405/171 |
| 2005/0117973 A1 | * | 6/2005 | Nelson | F16L 1/036 405/184.5 |
| 2005/0232705 A1 | * | 10/2005 | Scainl | E02F 5/10 405/159 |
| 2011/0211913 A1 | * | 9/2011 | Lazzarin | E02F 5/04 405/163 |
| 2011/0286803 A1 | * | 11/2011 | Baldinger | E02D 27/46 405/181 |
| 2013/0121769 A1 | * | 5/2013 | Gately | B66C 23/44 405/174 |
| 2013/0313353 A1 | * | 11/2013 | Novotny | E21B 43/26 242/419.8 |
| 2015/0174661 A1 | * | 6/2015 | Brandstrom | B23K 37/0276 228/9 |

* cited by examiner

AUTOMATIC CONTINUOUS OPERATION ROBOT FOR LAYING LARGE-DIAMETER PIPELINES AND OPERATING METHOD THEREFOR

BACKGROUND OF THE INVENTION

1. Field of the Invention

The present invention relates to a pipeline laying apparatus, and in particular, to an automatic continuous operation robot for laying large-diameter pipelines and an operating method therefor.

2. Description of Related Art

At present, with the rapid development of economic construction, China, especially the eastern district, has a strong demand for oil and gas resources. Due to relatively low domestic self-sufficiency rate and uneven distribution of oil and gas resources, they need to be largely introduced from the western district of China and even from abroad; while Northwest China and neighbors near the district are rich in oil and gas resources and are seeking for consumers. With the advancing of the Belt and Road Initiative, the West-to-East Pipeline Project, which is key to coordinating the development of East and West China, has been in full swing and accelerated. Pipeline transportation, especially large-diameter pipeline transportation of oil and gas, is more competitive in economic efficiency, and large-diameter pipeline transportation for thousands of kilometers is demanded in the market. The laying of metal pipelines having a diameter of above 1.0 m is basically semi-mechanized, and the excavation, laying, welding, measurement, monitoring, detection, and backfilling systems are independent and require manual coordination and commanding, so that the degree of automation is low, plenty of labor forces are required and the labor intensity is high, the natural environment and the welding environment are harsh, the transportation efficiency is low, the laying period is long, and the laying cost is high. Therefore, it is imperative to use automatic laying technologies in the construction of long-distance and large-diameter pipelines, and an appropriate design scheme is of great significance for the laying of oil and gas pipelines.

SUMMARY OF THE INVENTION

The technical problem to be solved by the present invention is to provide an automatic continuous operation robot for laying large-diameter pipelines which has a high degree of automation and an operating method therefor.

To solve the above technical problem, the automatic continuous operation robot for laying large-diameter pipelines provided by the present invention includes a platform, a main frame, an operation room, a navigation subsystem, a pipe grabbing and conveying subsystem, a pipe end face pre-treatment subsystem, an on-line measurement subsystem, a pipe supporting subsystem, a welding and welding quality inspection subsystem, and a control system.

The bottom of the platform is provided with crawler belts for movement.

The main frame is capable of moving horizontally in a Z-direction relative to the platform.

The operation room is arranged on the platform.

The navigation subsystem is used for preliminarily positioning a construction site, to ensure that the entire robot travels to the construction site.

The pipe grabbing and conveying subsystem is used for grabbing a pipe and conveying the pipe into a trench. The pipe grabbing and conveying subsystem includes two mechanical arms which are mounted on the main frame and are capable of moving horizontally in an X-direction, two telescopic devices respectively mounted on end portions of the two mechanical arms, and two grippers for grabbing a pipe, the two grippers being respectively mounted on output ends of the two telescopic devices and capable of moving vertically in a Y-direction.

The pipe end face pre-treatment subsystem is used for performing groove machining on two ends of a pipe. The pipe end face pre-treatment subsystem includes two tensioning mechanisms which are capable of rotating independently, symmetrically mounted on the platform, and used for fixing a pipe; multiple cutters which are rotatably mounted on the two tensioning mechanisms and are used for performing groove machining on two ends of a pipe; and multiple supporting wheels which are retractably mounted on the platform and used for holding up a pipe. The two tensioning mechanisms are capable of relatively extending and retracting, and are inserted in inner holes on two ends of a pipe for fixing the pipe in a tensioning manner. The pipe is forced to rotate along with the rotation of the two tensioning mechanisms. When the end face pre-treatment subsystem is dealing with two end faces of a pipe, the on-line measurement subsystem measures synchronously to obtain geometric sizes and position coordinates of each end face of the pipe, and sends the measurement data to the control system. The control system analyzes the final measurement data, screens out size data about the maximum wall thickness and the minimum wall thickness, traces the position coordinates corresponding to the maximum wall thickness and the minimum wall thickness, records the position coordinates in the control system, and explicitly marks, on the pipe, the positions corresponding to the maximum and minimum wall thickness on the two ends respectively. When the tensioning mechanisms on two ends of the pipe end face pre-treatment subsystem are driven to rotate again by the control system and stops, the current welding end faces of a current pipe and a previous pipe are fitted according to a principle that the area coincidence is maximal.

The pipe supporting subsystem is used for supporting a pipe placed in a trench. The pipe supporting subsystem includes a middle supporting assembly for holding up the central portion of a pipe and a lifting hook assembly capable of moving up and down and used for being locked and fixed at a front end of the pipe. The middle supporting assembly is retractably mounted on the central portion of a base plate of the platform. An upper end of the lifting hook assembly is connected to the base plate of the platform through a sliding mechanism, and a lower end of the lifting hook assembly is provided with a clamping block which is capable of being inserted in an inner hole of the pipe and locking the pipe. A telescopic rod is arranged between the sliding mechanism and the clamping block, and is further provided with a first photographing and measuring device for checking the posture of a current pipe. The measurement data obtained by the first photographing and measuring device is sent by the on-line measurement subsystem to the control system. The control system controls and drives the lifting hook assembly to move in the X-direction and Z-direction, and finely adjusts the posture of the current pipe till it conforms to the pipeline laying specification.

The welding and welding quality inspection subsystem is retractably mounted at a rear end of the base plate of the platform and is used for welding joint parts between a current pipe and a previous pipe. The welding and welding quality inspection subsystem includes a welding assembly A and a welding assembly B which are both of an annular structure. Multiple rolling supports are provided along an inner circumference of the welding assembly A and the welding assembly B respectively. Rollers and a first electromagnetic sucker for attaching to a pipe are mounted on the bottom of each rolling support. The welding assembly A is provided with an annular guide-rail device, multiple welding machine travelling mechanisms are mounted on the annular guide-rail device, and each welding machine travelling mechanism is provided with a welding gun for welding joint parts of a current pipe and a previous pipe and a nondestructive testing monitoring device for checking a welding seam. The welding assembly A is further provided with multiple telescopic pull rods. An oval structure is fixed on an outer end of each pull rod and is extended and inserted into a slot of a corresponding shape on the welding assembly B. The pull rod is then rotated by 90° to make the oval structure on the pull rod and the slot on the welding assembly B cross each other. After that, the pull rod is retracted and locked, to fixedly connect the welding assembly A and the welding assembly B. The welding assembly B is further provided with a second photographing and measuring device for determining positions of the welding assembly B and a pipe. The measurement data obtained by the second photographing and measuring device is sent by the on-line measurement subsystem to the control system. The control system controls the welding assembly B to lock the pipe.

The control system is used for controlling operation of the entire robot.

The number of the crawler belts is two and the two crawler belts are respectively arranged at two sides of the bottom of the platform.

The number of the crawler belts is four and the four crawler belts are respectively arranged at four corners of the bottom of the platform. The platform is capable of moving up and down relative to the four crawler belts, and each crawler belt is capable of being steered.

The platform is further provided with a residential room capable of moving up and down.

The navigation subsystem adopts the BeiDou navigation system, GPS navigation system, GLONASS navigation system, or Galileo navigation system.

Each telescopic device is provided with a detector for detecting a pipe, thereby enabling the two grippers to accurately grab a pipe.

Each tensioning mechanism includes a jig frame, a rotating expander sleeve fitted outside the jig frame through rolling bearings, multiple tapered tensioning blocks circumferentially and fixedly connected at an end portion of the rotating expander sleeve through an elastic tensioning arm respectively, and a tapered plug which is matched with the tapered tensioning blocks for use and is used for raising the tapered tensioning blocks in a tensioning manner. The jig frame is connected to an output end of a power cylinder through supporting guide columns, to realize extension and retraction of the jig frame. A bull gear is arranged outside the rotating expander sleeve and is meshed with a gear at an output end of a motor, to enable the rotating expander sleeve to rotate relative to the jig frame and drive the pipe to rotate.

The central portion of the tapered plug is rotatably connected to an oil cylinder output rod through a thrust bearing. The tapered plug is driven by the oil cylinder output rod to perform extending and retracting movement, such that the tapered tensioning blocks are raised in a tensioning manner and are reset.

A carrier block is provided on the bottom of the middle supporting assembly. A semicircular groove fitted with the pipe is formed on an upper portion of the carrier block, and a travelling wheel is provided on a lower portion of the carrier block. A connecting rod is vertically and fixedly connected at two sides of the carrier block respectively. Upper ends of the two connecting rods are respectively hinged to the base plate of the platform, and upper portions of the two connecting rods are further respectively connected to the base plate of the platform through a cylinder, to realize extension and retraction of the middle supporting assembly.

A vertical rod is vertically and fixedly connected at two sides of the welding assembly A respectively. Upper ends of the two vertical rods are respectively hinged to the base plate of the platform, and upper portions of the two vertical rods are further respectively connected to the base plate of the platform through a cylinder, to realize extension and retraction of the welding and welding quality inspection subsystem. A rotating wheel is further provided on the bottom of the welding assembly A.

An operating method for automatic continuous laying of pipelines by using the automatic continuous operation robot for laying large-diameter pipelines includes the following steps:

1) enabling the robot to move to an excavated earthwork plane, performing accurate initial positioning according to the navigation subsystem, then extending the telescopic supporting arms, and retracting the crawler belts;

2) firstly stretching out the middle supporting assembly and the welding and welding quality inspection subsystem on the main frame of the robot till they are perpendicular to the platform plane; detecting, by the detector in the pipe grabbing and conveying subsystem on the main frame, the position of a pipe and feeding back the detected position to the control system; driving, by the control system, the two grippers of the pipe grabbing and conveying subsystem to grab the pipe and automatically lift and laterally convey the pipe to a specified position of the pipe end face pre-treatment subsystem on the robot platform under the control of the control system;

3) positioning, by the two tensioning mechanisms in the pipe end face pre-treatment subsystem, two end faces of the pipe in a tensioning manner at the same time, retracting the two grippers, and holding up the pipe by the supporting wheels on the platform to keep the horizontal deflection of the pipe being 0, then performing milling and turning of planes and grooves and grinding of edges and burrs, and retracting the supporting wheels on the platform after the end face treatment is completed;

4) when the pipe end face pre-treatment subsystem is dealing with the pipe, measuring, by the on-line measurement subsystem, the end face sizes of the pipe to respectively obtain the maximum diameter and the minimum diameter of the two ends, marking the numerical values of the maximum and minimum diameters of the two ends and the positions thereof, and meanwhile recording and storing the accurate position coordinates in the control system;

5) grabbing the pipe again by the two grippers in the pipe grabbing and conveying subsystem, retracting the two tensioning mechanisms in the pipe end face pre-treatment subsystem, and vertically conveying, by the two grippers, the pipe to a horizontal pipe welding position in an underground trench; then enabling the pipe to move horizontally in a Z-direction, such that a welding end face C of the pipe passes through an inner hole of the welding assembly B in the welding and welding quality inspection subsystem; inserting the lifting hook assembly into an inner hole of the pipe from a welding end face D of the pipe and locking the lifting hook assembly to the welding end face D to support the pipe; releasing, retracting, and resetting the two grippers in the pipe grabbing and conveying subsystem; measuring, by the first photographing and measuring device, the posture of the pipe and feeding back, by the on-line measurement subsystem, the measurement result to the control system; driving, by the control system, the lifting hook assembly according to a system-specified posture; after the lifting hook assembly adjusts the horizontal posture of the pipe and accurately positions the pipe, backfilling earthworks into the trench by using a backfilling device, the earthwork backfilling achieving a supporting effect; retracting the telescopic supporting arms by the robot platform, enabling the robot platform to move in the Z-direction along the pipe wall, and enabling the welding and welding quality inspection subsystem to continuously move with the robot platform; when the robot platform approaches the welding end face D of the pipe, releasing and retracting the lifting hook assembly, and when the robot platform reaches a system-specified welding position on the welding end face D of the pipe, removing the welding assembly B from the pipe, locking the welding assembly A on the pipe, and positioning the pipe by the welding assembly A;

6) grabbing, by the two grippers in the pipe grabbing and conveying subsystem on the main frame, a current pipe at a pre-determined position, and automatically lifting and laterally conveying the pipe to a specified position of the pipe end face pre-treatment subsystem on the robot platform under the control of the control system;

7) repeating Step 3) and Step 4);

8) retrieving, by the on-line measurement subsystem, size information of the welding end face D of the previous pipe, comparing and matching the size information with data about the welding end face C of the current pipe, and adjusting the angle of the current pipe according to a principle that the area coincidence is maximal;

9) vertically conveying, by the pipe grabbing and conveying subsystem, the current pipe to an underground horizontal pipe welding position; then driving the current pipe to move horizontally in the Z-direction, such that the welding end face C of the current pipe passes through the inner hole of the welding assembly B and coincides with an axis of the welding assembly A; when the distance from the welding assembly B to the current welding end face of the current pipe meets the requirement of the control system, locking and fixing the welding assembly B with the current pipe; and performing horizontal movement in the Z-direction by the current pipe under the effect of the telescopic pull rods on the welding assembly A, such that the current pipe contacts the welding end face D of the previous pipe and is then locked, enabling the welding assembly A to be fixedly connected with the welding assembly B which is fixed to the current pipe;

10) driving, by the control system, the lifting hook assembly to be locked and fixed with the welding end face D of the current pipe;

10) driving, by the control system, the middle supporting assembly to hold up the central portion of the current pipe;

12) adjusting, by the control system, the posture of the current pipe;

13) fixing, by the welding and welding quality inspection subsystem, the two pipes through symmetrical spot welding, where four welding guns on the welding assembly A start welding from four symmetrical spots at the same time and an entire welding seam is accumulated by at least three layers, each welding gun is responsible for welding ¼ of a circumference on the same welding layer, and when a second layer is to be welded, the four welding guns are all raised by the height of one welding layer in real time before welding a next ¼ of a circumference, and the rest is deduced in the same manner till the welding demand is satisfied;

14) performing nondestructive testing on the welding seam by the nondestructive testing monitoring device, generating an alarm on site when a flaw is detected, marking the flaw, and feeding back the result to the control system for storage and printout, where the defect is compensated by the control system;

15) unlocking and releasing the welding assembly A and the welding assembly B from the previous pipe, rotating and unlocking the pull rods, and hanging the welding assembly B on the pull rods;

16) retracting the telescopic supporting arms and extending the crawler belts by the robot platform, ensuring that a reference point for Y coordinates of the platform stays unchanged; enabling the robot platform to move in the Z-direction along the current pipe wall; backfilling earthworks by the backfilling device afterwards, the earthwork backfilling achieving a supporting effect; enabling the welding and welding quality inspection subsystem to continuously move with the robot platform; when the robot platform approaches the welding end face D of the current pipe, releasing and retracting the lifting hook assembly, and when the robot platform moves to a system-specified welding position on the welding end face D of the current pipe, removing the welding assembly B from the current pipe, and positioning the current pipe by the welding assembly A;

17) enabling the robot platform to advance along a path excavated by an earthwork excavation device and pause at one unit pipe length, and then extending the telescopic supporting arms and retracting the crawler belts;

18) continuously excavating a trench of one unit pipe length by the excavation device; and 19) cyclically performing Step 6) to Step 18).

The present invention has the following beneficial effects. The automatic continuous operation robot for laying large-diameter pipelines provided by the present invention has a high degree of automation, requires a few labor forces, and has low labor intensity, high working efficiency, a short laying period, and low laying cost.

DETAILED DESCRIPTION OF THE PREFERRED EMBODIMENTS

The present invention is further described in detail below by reference to the specific embodiments and the accompanying drawings.

Figure 1:
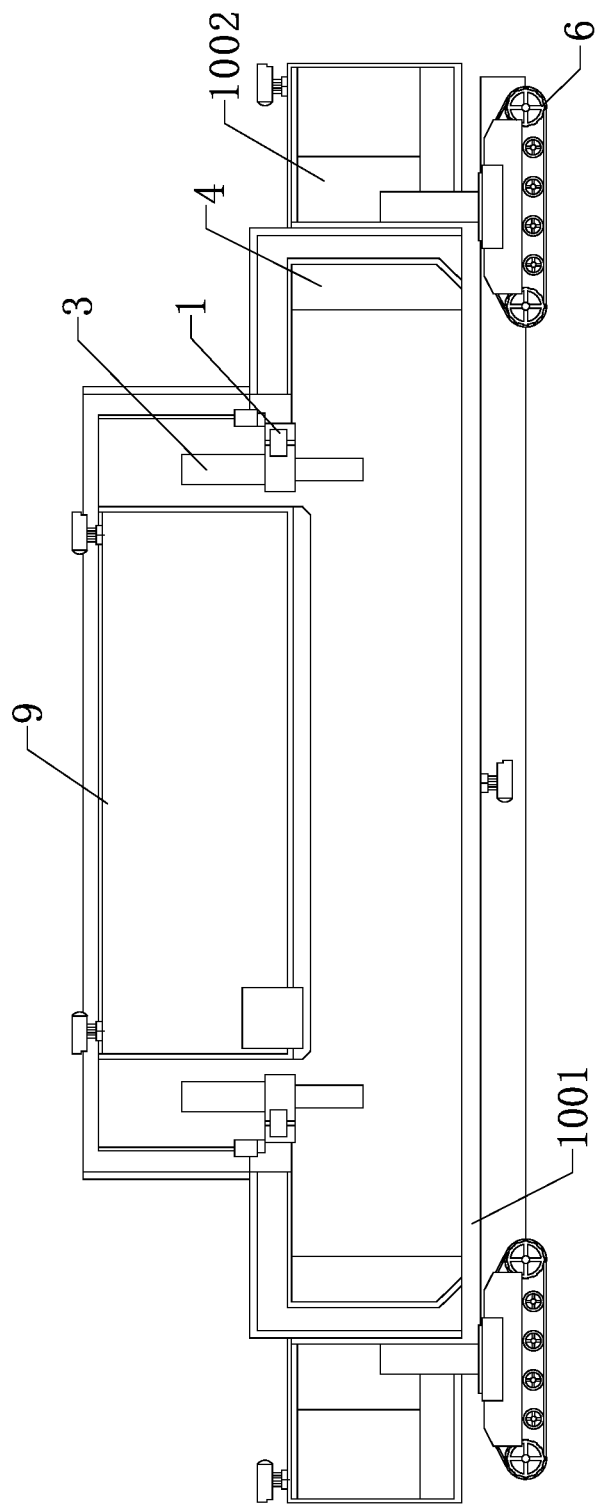
FIG. 1 is a schematic front structural diagram of an automatic continuous operation robot for laying large-diameter pipelines in the present invention.
Figure 2:
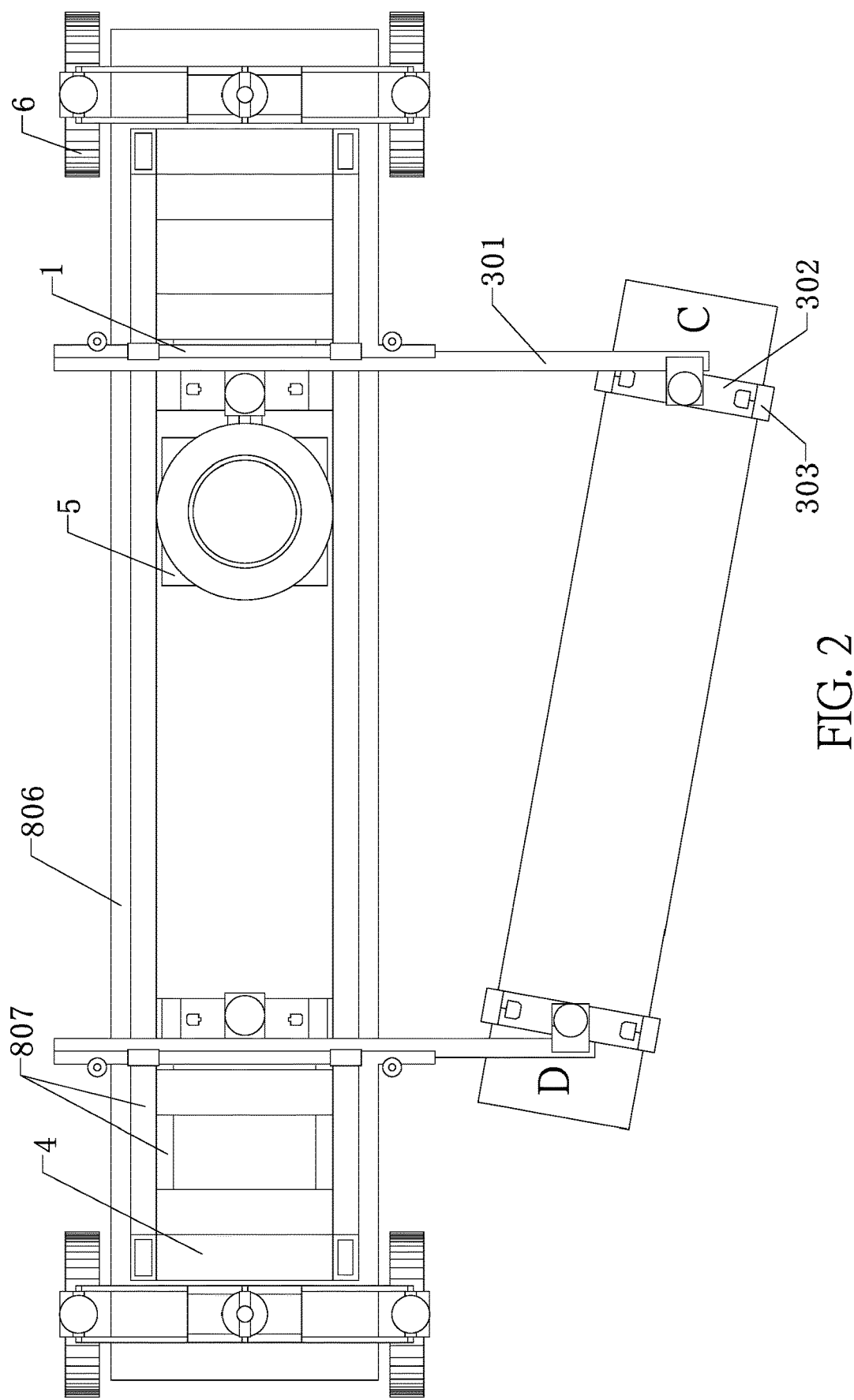
FIG. 2 is a schematic top structural diagram of the automatic continuous operation robot for laying large-diameter pipelines without a residential room in the present invention.
Figure 3:
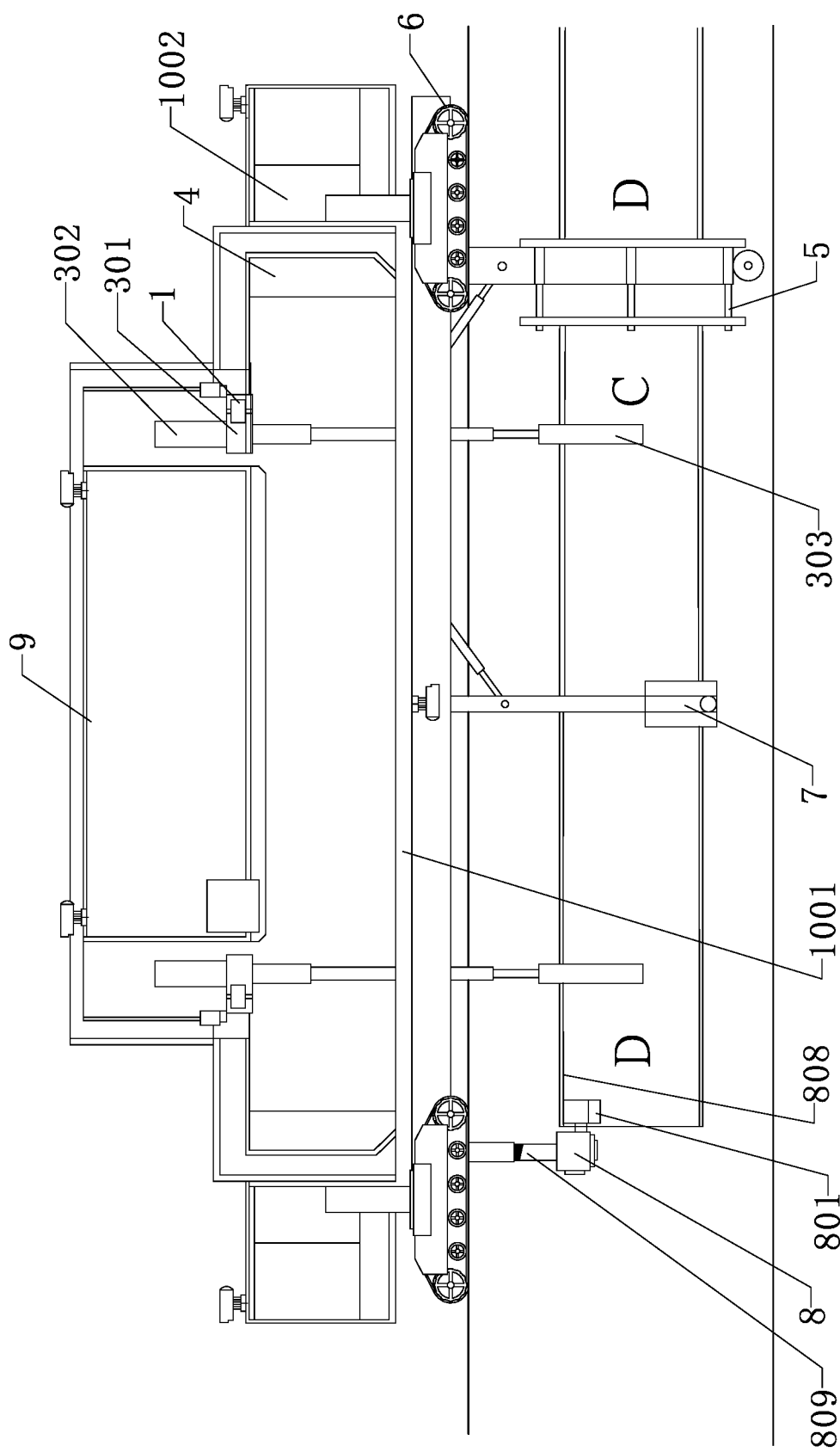
FIG. 3 is a schematic front structural diagram of the automatic continuous operation robot for laying large-diameter pipelines before welding in the present invention.
Figure 4:
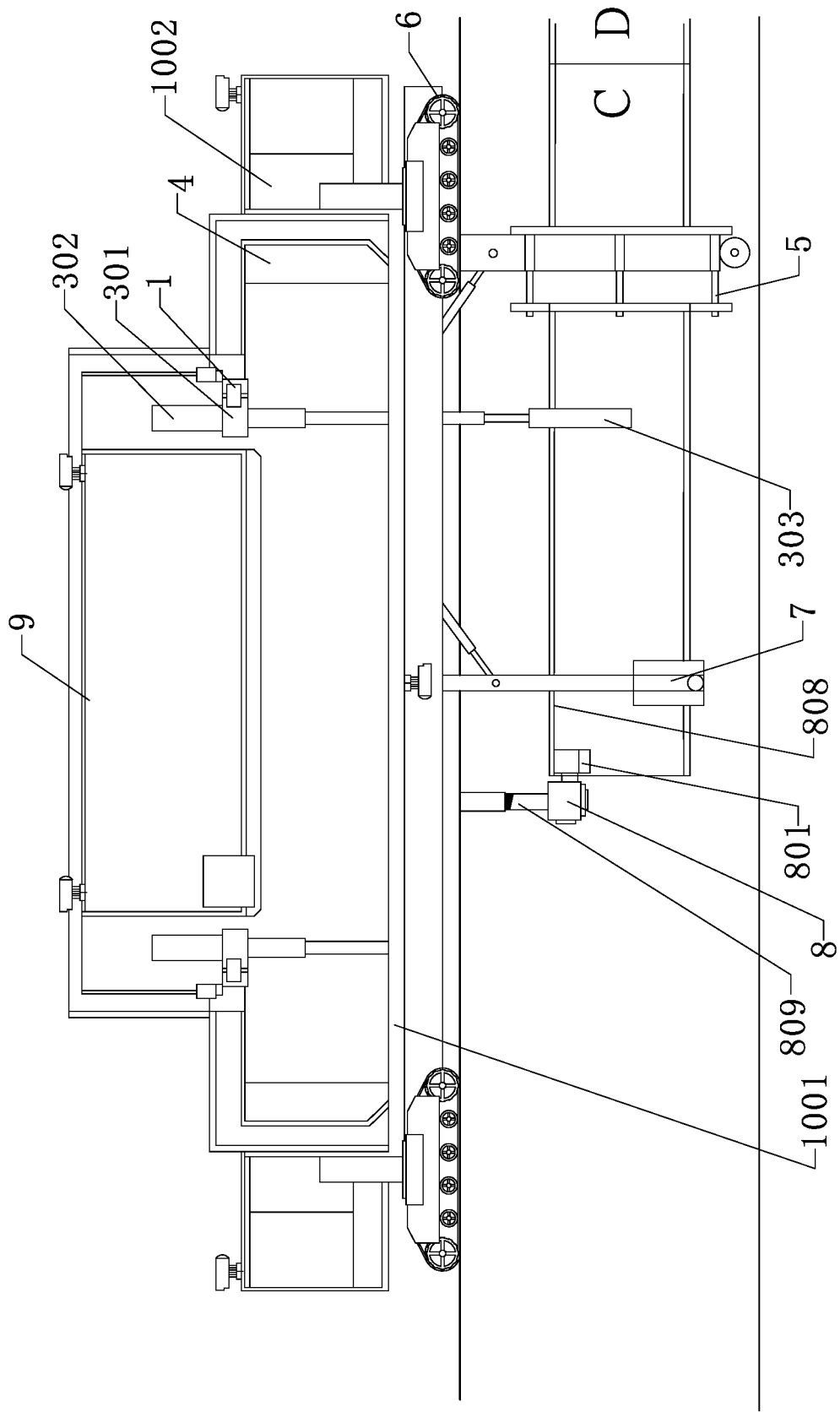
FIG. 4 is a schematic front structural diagram of the automatic continuous operation robot for laying large-diameter pipelines during movement after welding in the present invention.
Figure 5:
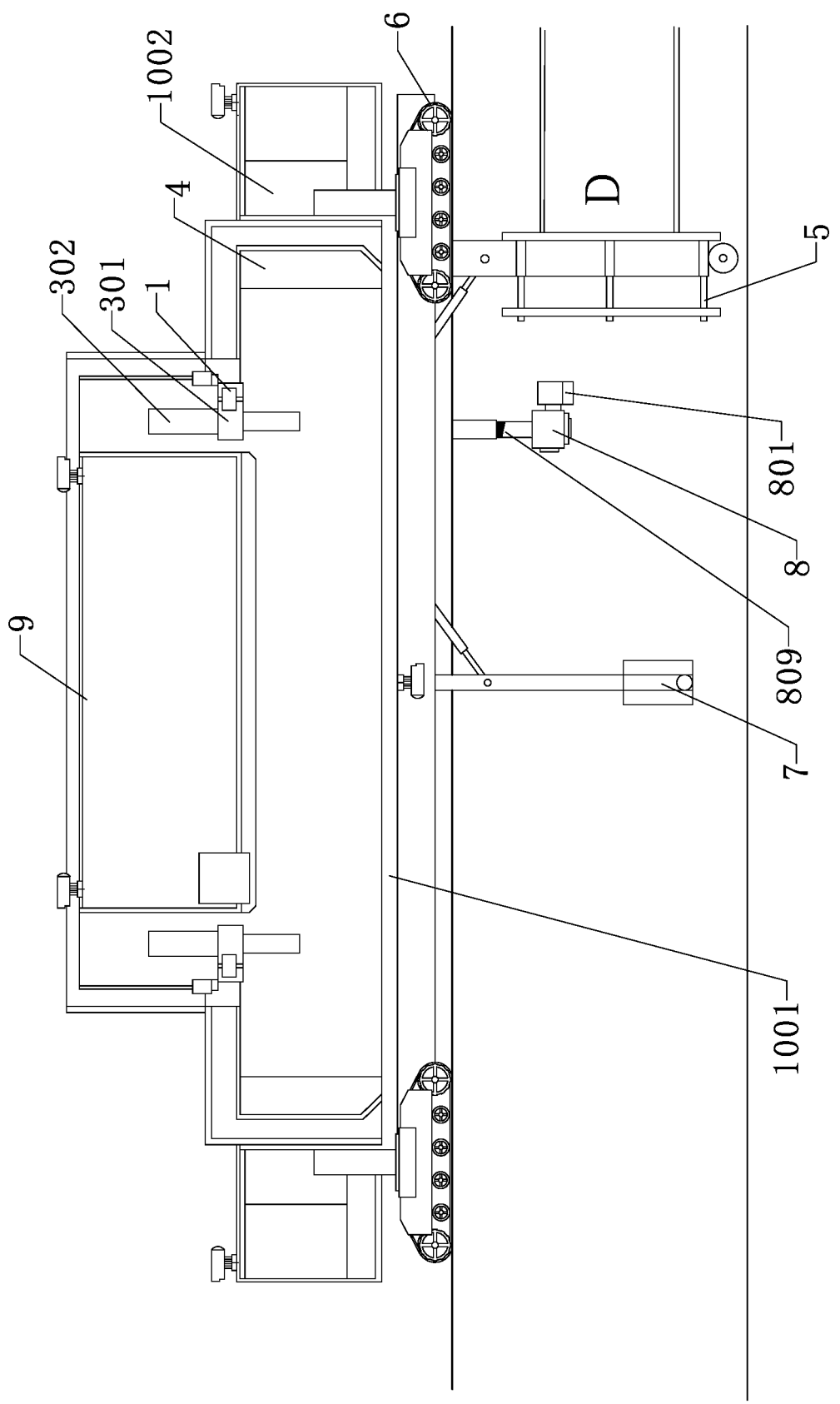
FIG. 5 is a schematic front structural diagram of the automatic continuous operation robot for laying large-diameter pipelines after welding and moving to a next working position in the present invention.
Figure 6:
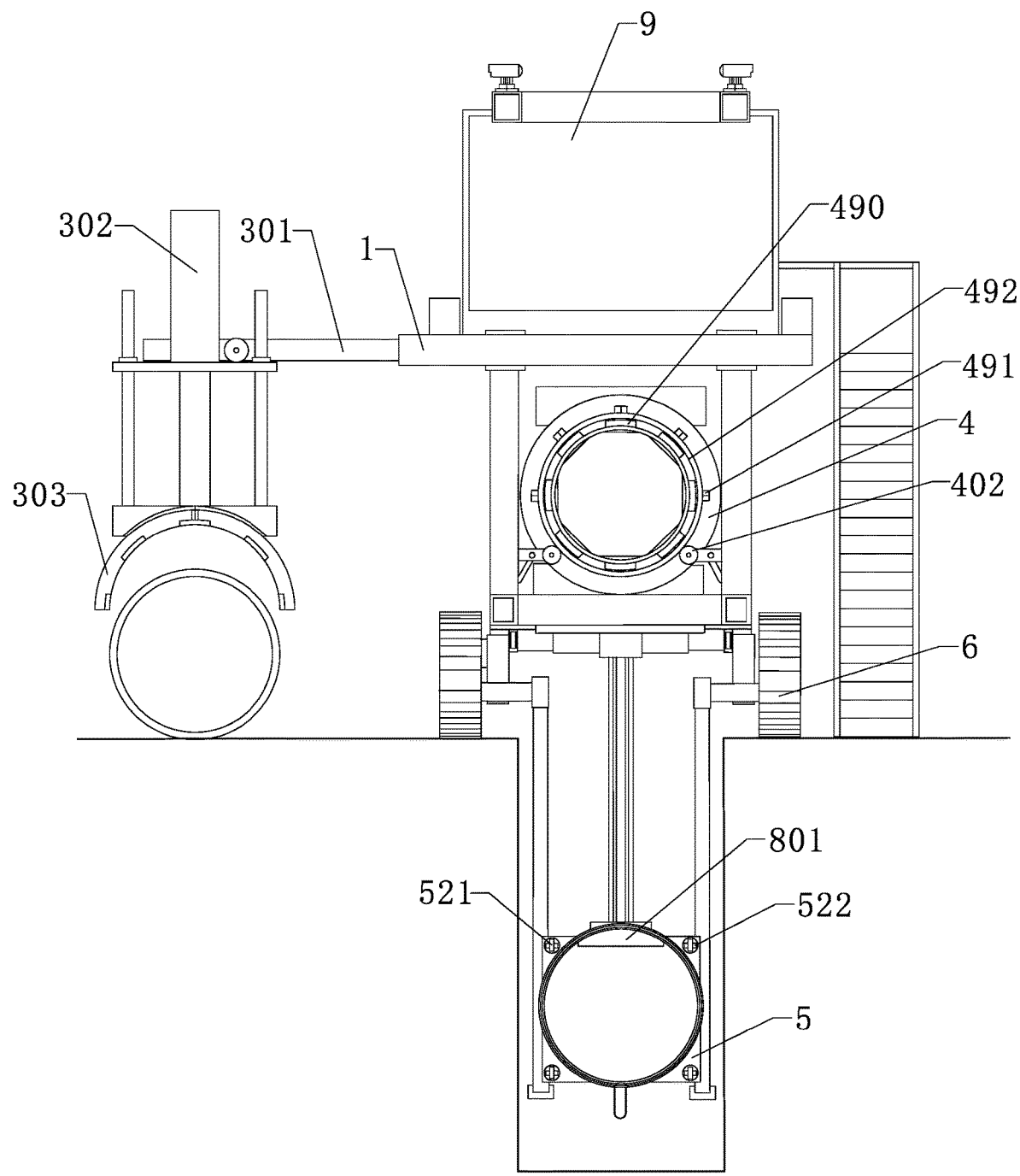
FIG. 6 is a schematic right structural diagram of the automatic continuous operation robot for laying large-diameter pipelines in the present invention.
Figure 7:
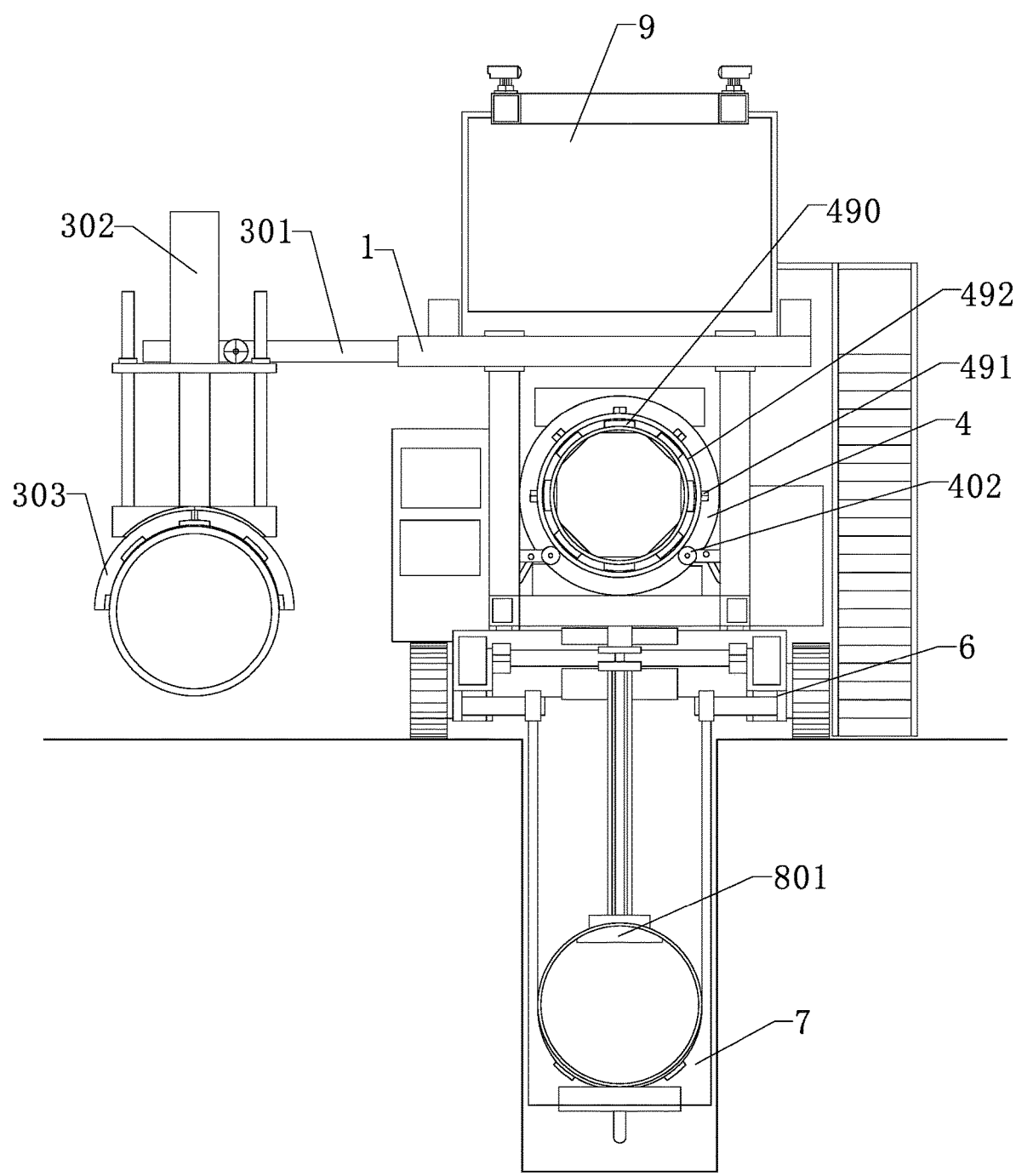
FIG. 7 is a schematic right structural diagram of the automatic continuous operation robot for laying large-diameter pipelines without a welding and welding quality inspection subsystem in the present invention.
Figure 8:
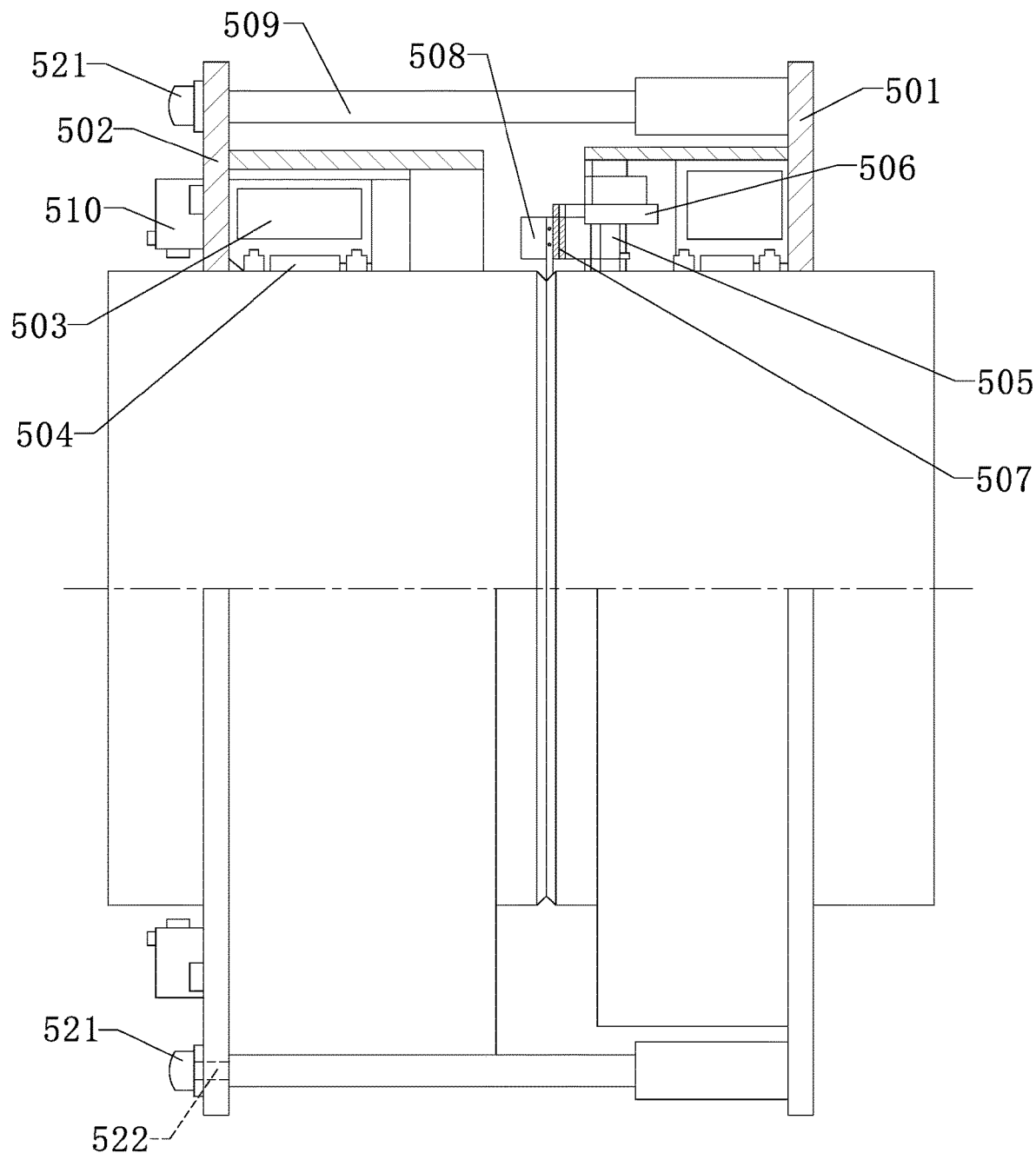
FIG. 8 is a schematic structural diagram of a welding and welding quality inspection subsystem in the present invention.
Figure 9:
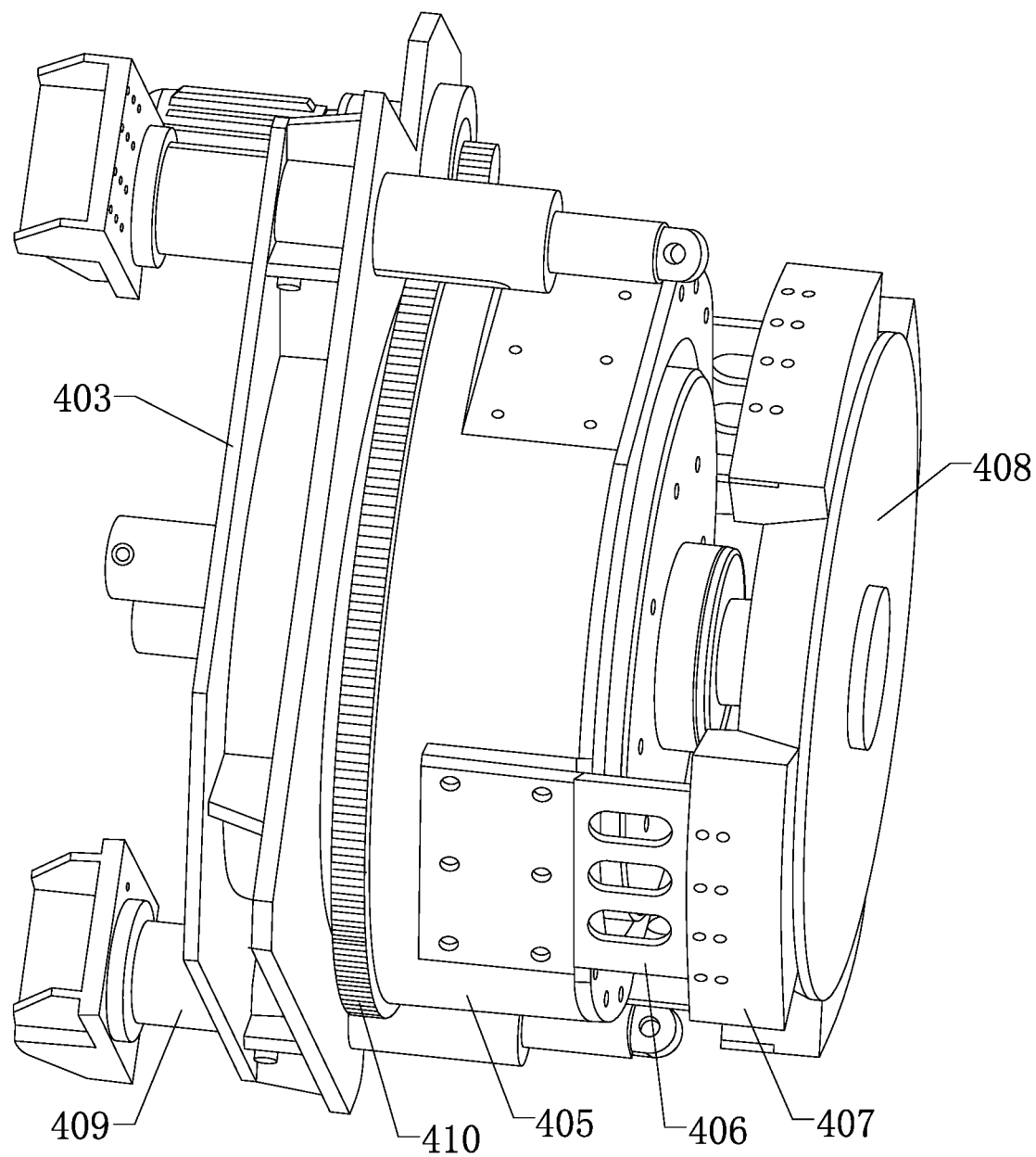
FIG. 9 is a schematic three-dimensional structural diagram of a tensioning mechanism in the present invention.
Figure 10:
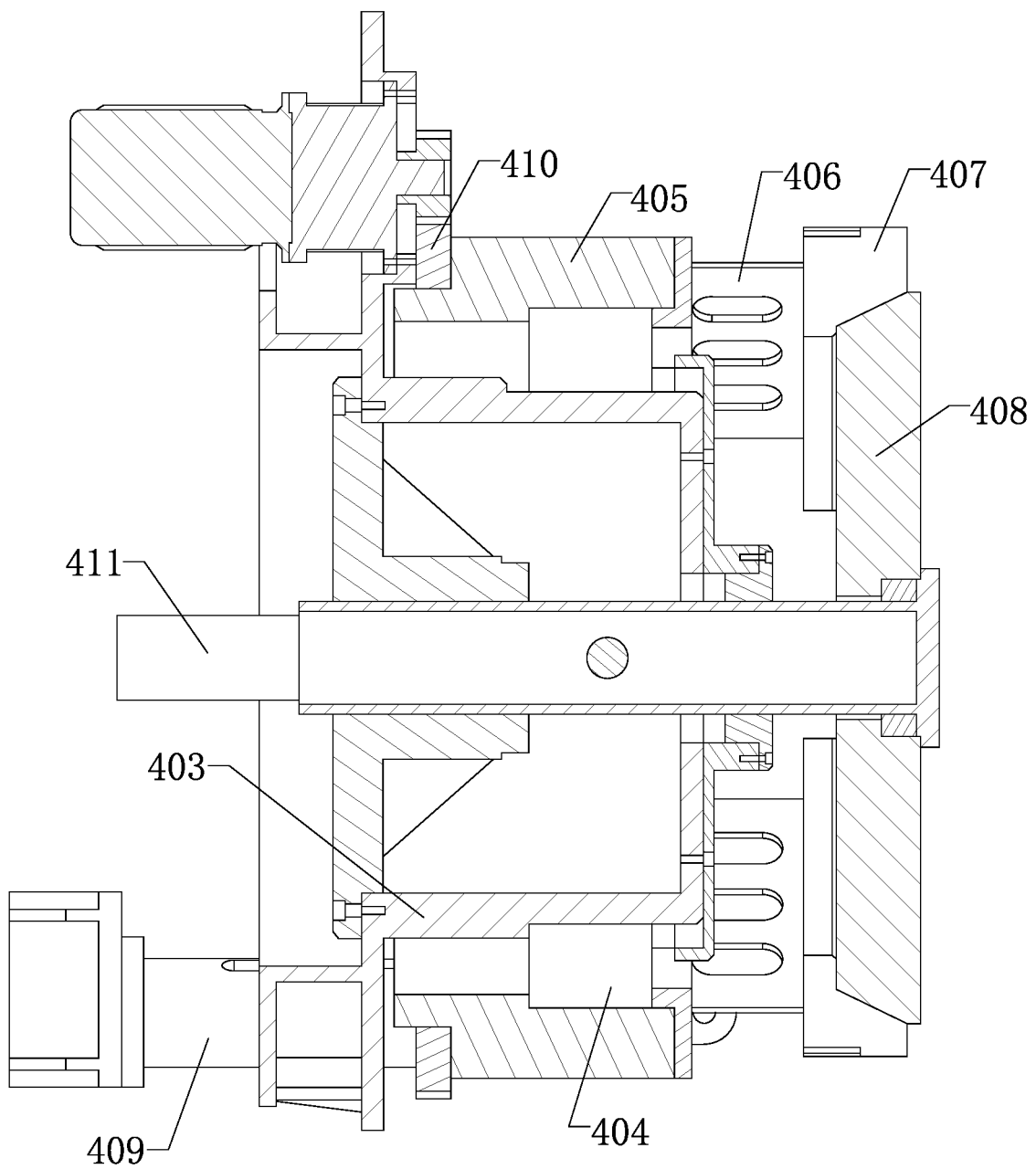
FIG. 10 is a schematic cross-sectional structural diagram of the tensioning mechanism in the present invention.
Figures 1, 11:
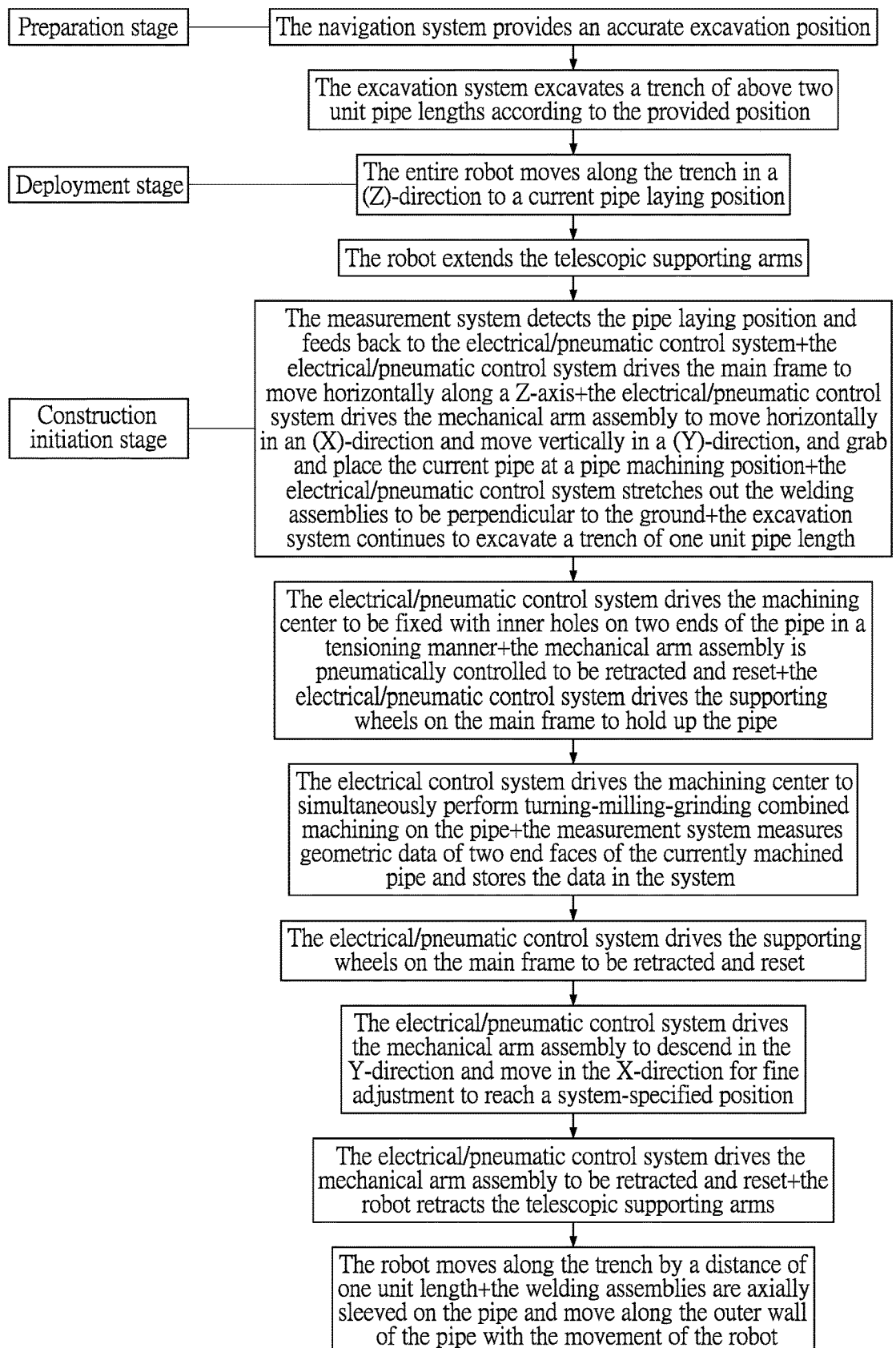
FIG. 11 is an operation flow chart of automatic continuous laying of pipelines in the present invention.
Figures 2, 11:
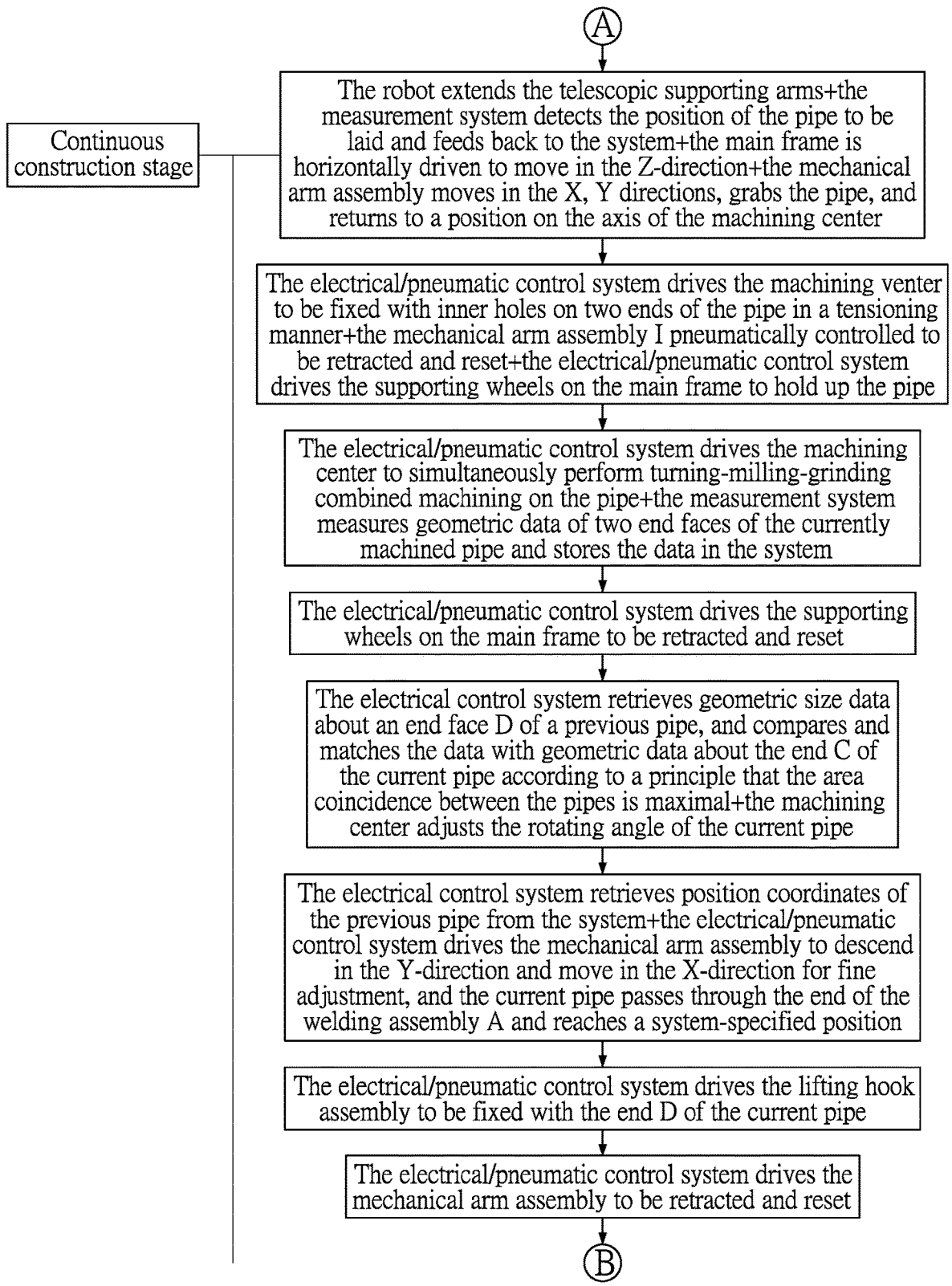
Figures 3, 11:
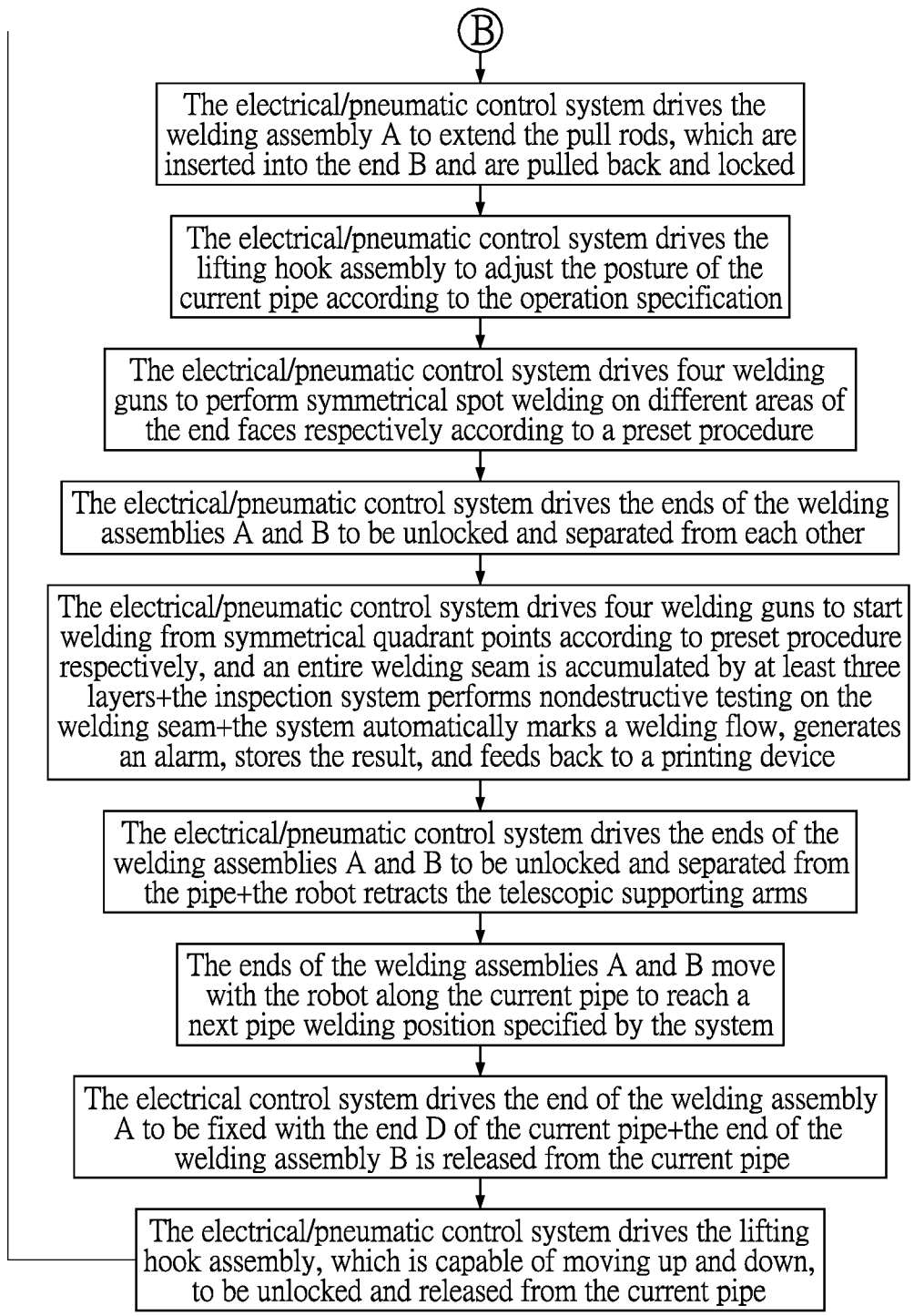
Figures 1, 12:
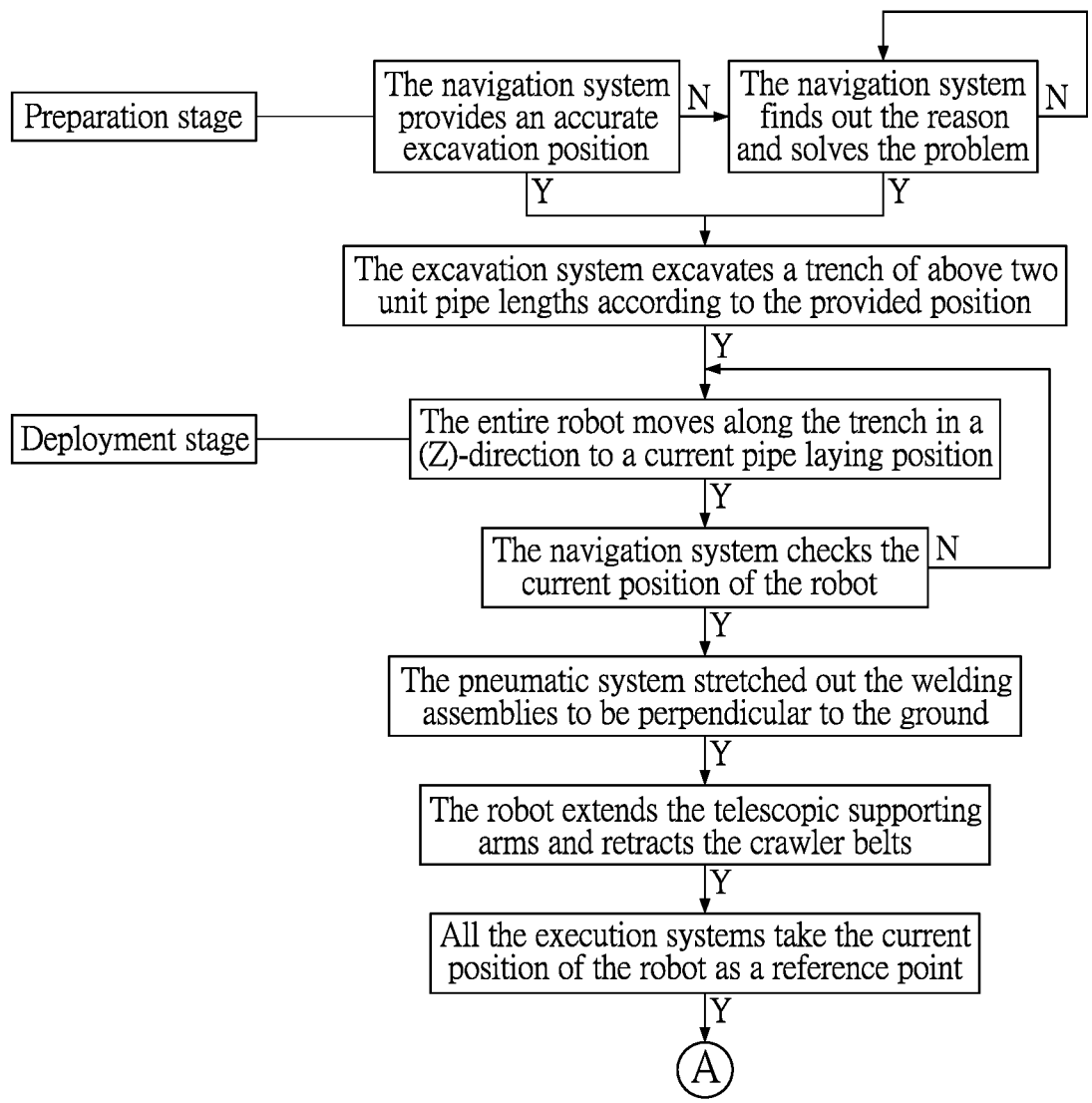
FIG. 12 is a flow chart of a control system in the present invention.
Figures 2, 12:
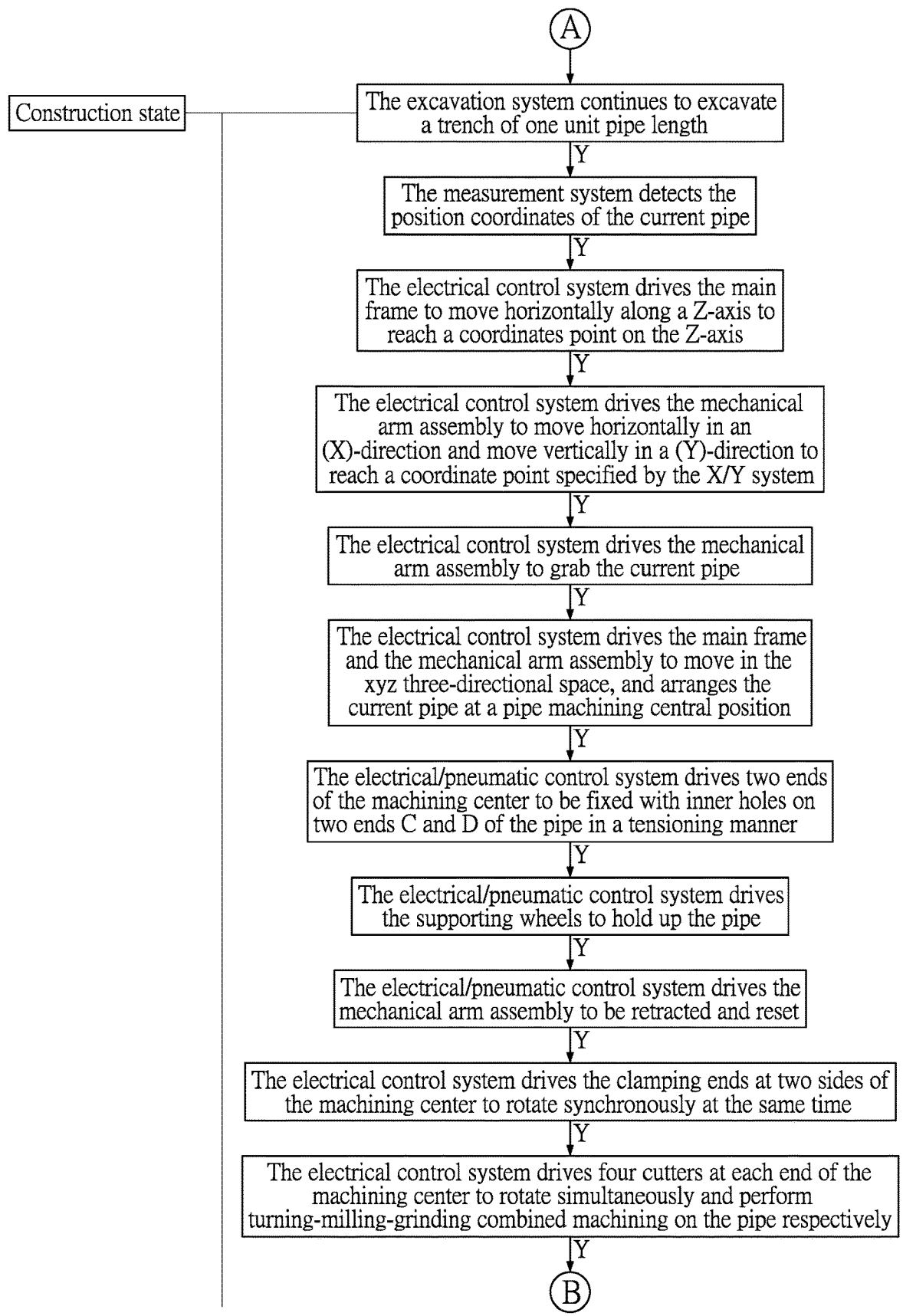
Figures 3, 12:
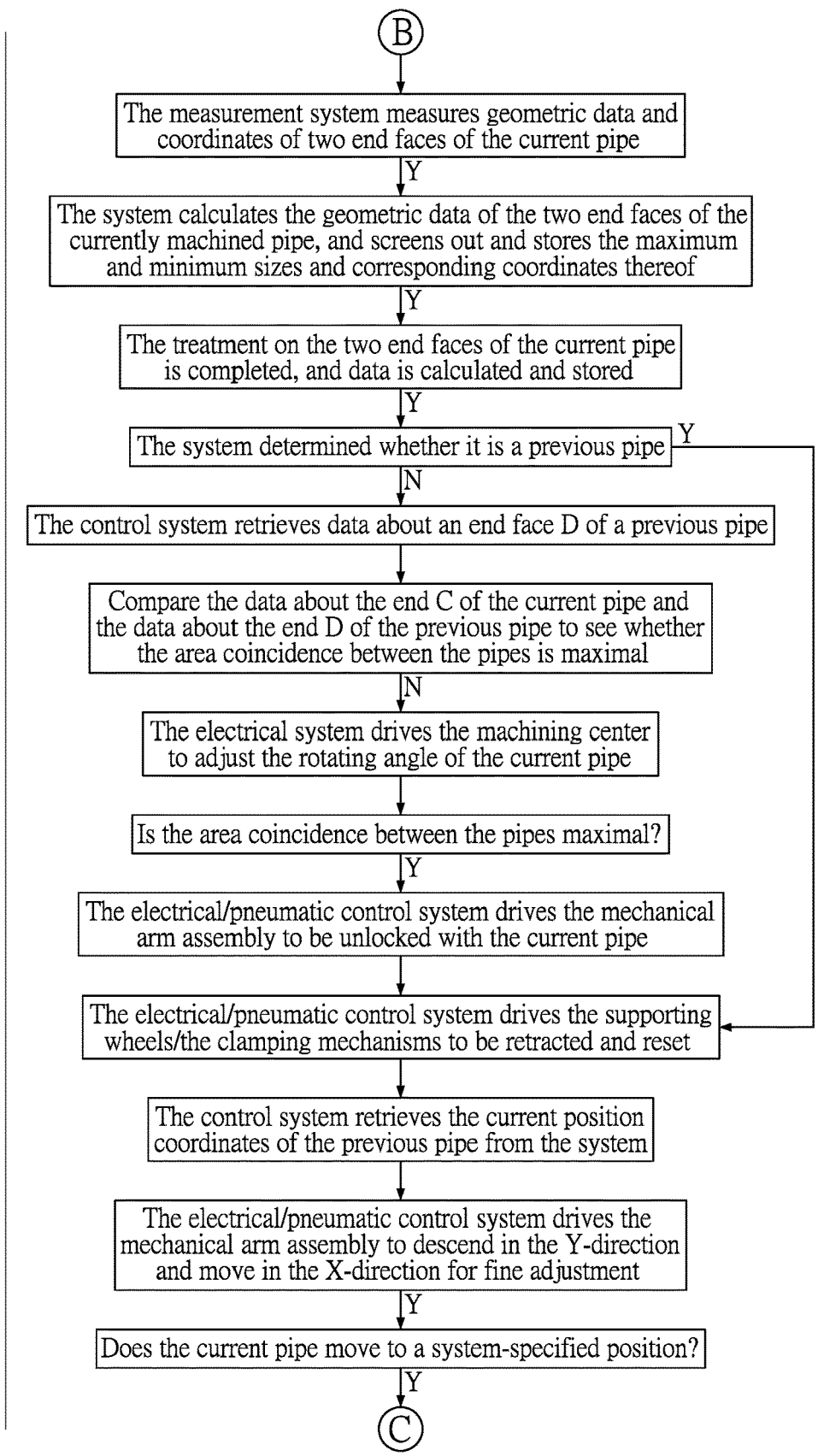
Figures 4, 12:
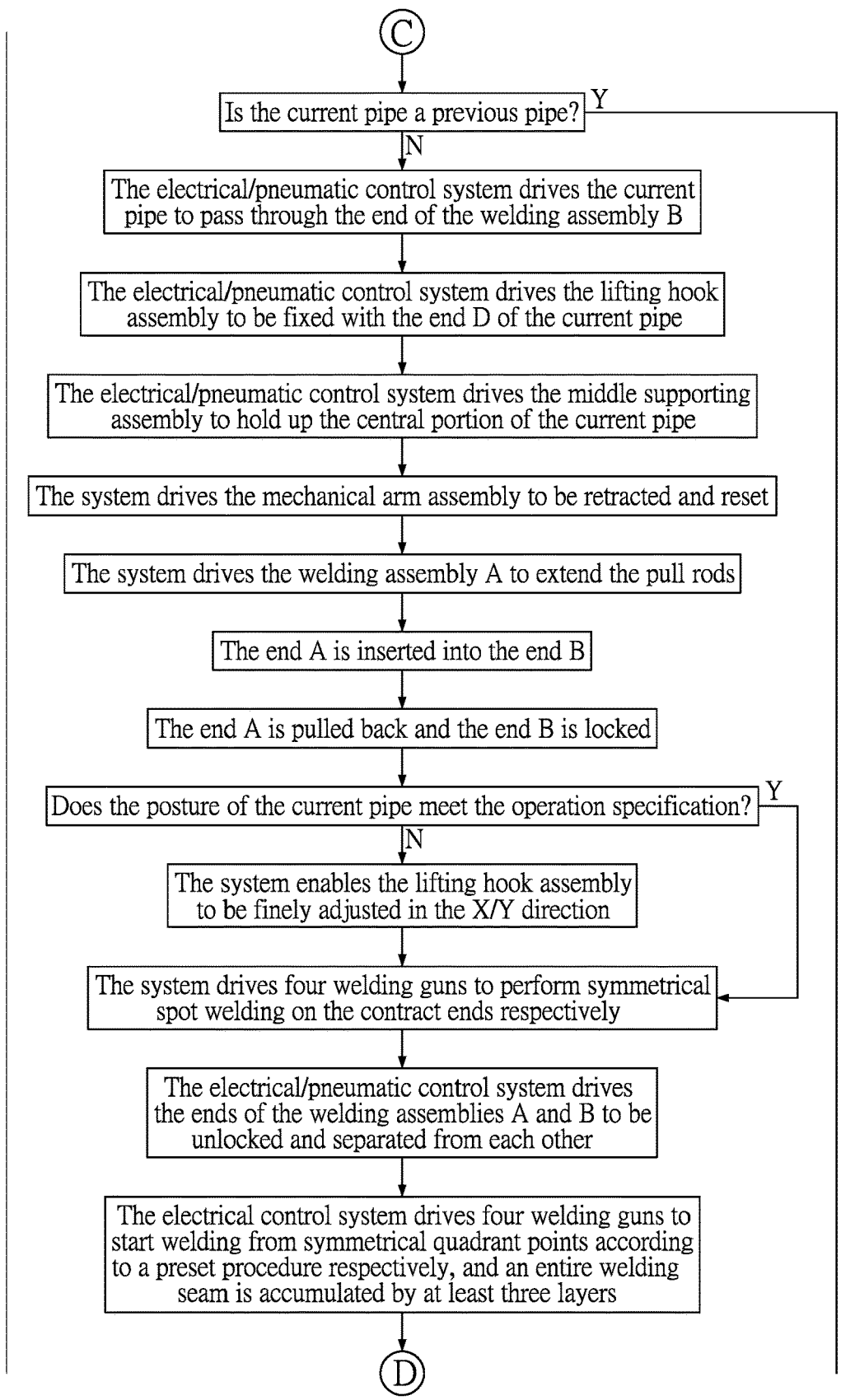
Figures 5, 12:
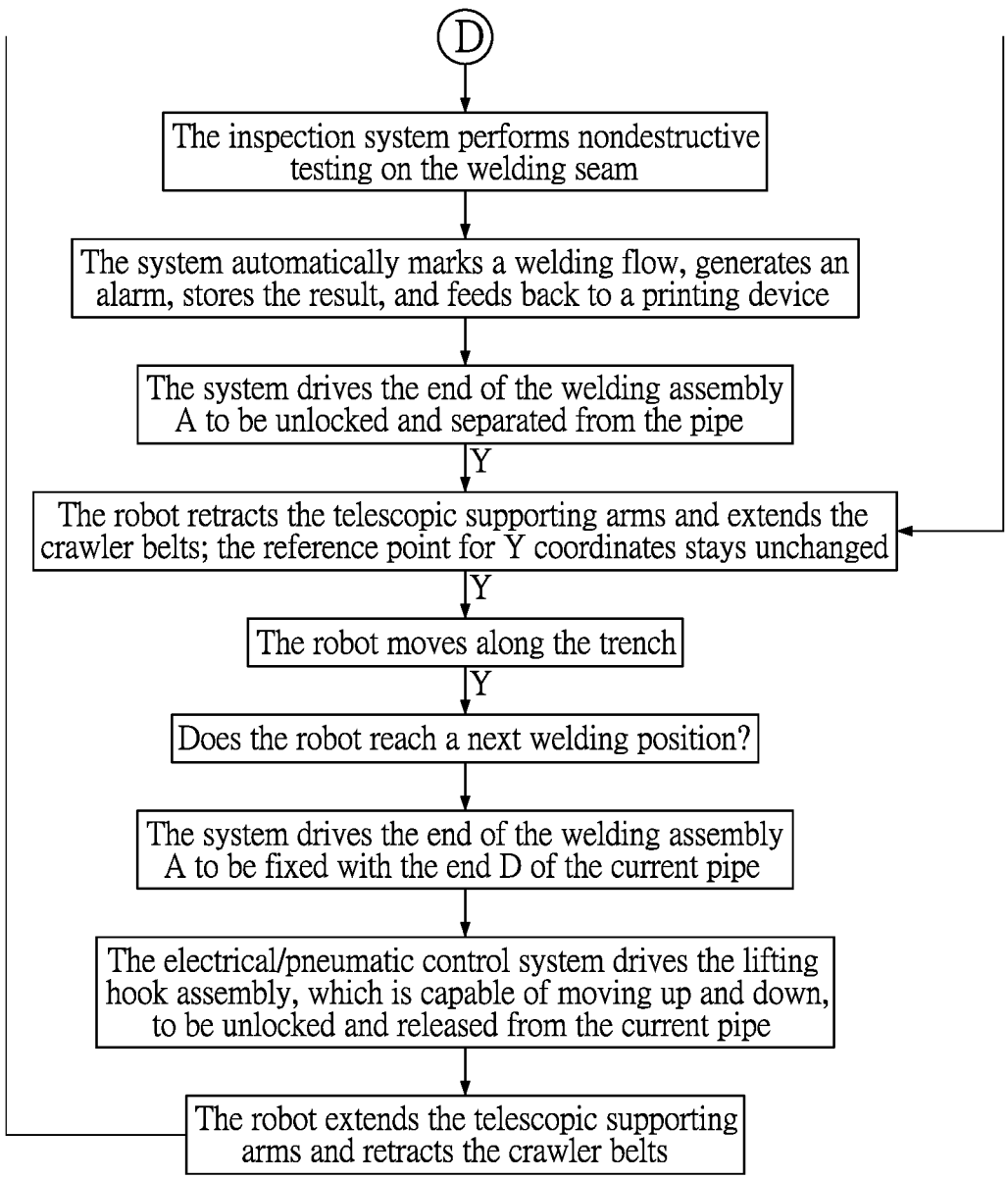

Referring to FIG. 1 to FIG. 12, an automatic continuous operation robot for laying large-diameter pipelines provided by the present invention includes a platform, a main frame 1, an operation room, a navigation subsystem 1002, a pipe grabbing and conveying subsystem 3, a pipe end face pre-treatment subsystem 4, an on-line measurement subsystem, a pipe supporting subsystem, a welding and welding quality inspection subsystem 5, and a control system.

The bottom of the platform 1001 is provided with crawler belts 6 for movement.

The main frame 1 is capable of moving horizontally in a Z-direction relative to the platform.

The operation room is arranged on the platform.

The navigation subsystem 1002 is used for preliminarily positioning a construction site, to ensure that the entire robot travels to the construction site.

The pipe grabbing and conveying subsystem 3 is used for grabbing a pipe and conveying the pipe into a trench. The pipe grabbing and conveying subsystem 3 includes two mechanical arms 301 which are mounted on the main frame 1 and are capable of moving horizontally in an X-direction, two telescopic devices 302 respectively mounted on end portions of the two mechanical arms 301, and two grippers 303 for grabbing a pipe, the two grippers 303 being respectively mounted on output ends of the two telescopic devices 302 and capable of moving vertically in a Y-direction.

The pipe end face pre-treatment subsystem 4 is used for performing groove machining on two ends of a pipe. The pipe end face pre-treatment subsystem 4 includes two tensioning mechanisms 490 which are capable of rotating independently, symmetrically mounted on the platform, and used for fixing a pipe; multiple cutters 491 which are rotatably mounted on the two tensioning mechanisms 490 and are used for performing groove machining on two ends of a pipe; and multiple supporting wheels 402 which are retractably mounted on the platform and used for holding up a pipe. The two tensioning mechanisms 490 are capable of relatively extending and retracting, and are inserted in inner holes 492 on two ends of a pipe for fixing the pipe in a tensioning manner. The pipe is forced to rotate along with the rotation of the two tensioning mechanisms 490. The cutters are milling cutters and grinding wheels which are circumferentially mounted on an annular body. The annular body is rotatable relative to the tensioning mechanisms, and is driven by a motor to rotate. Besides, it can be designed that the milling cutters are arranged in different angles to realize milling of the pipe end faces and groove milling of the pipe at the same time, and the grinding wheels are used for grinding edges and burrs on the grooves. A third photographing and measuring device is further provided on the platform. When the end face pre-treatment subsystem is dealing with two end faces of a pipe, the third photographing and measuring device measures synchronously to obtain geometric sizes and position coordinates of each end face of the pipe. The on-line measurement subsystem sends the measurement data to the control system. The control system analyzes the final measurement data, screens out size data about the maximum wall thickness and the minimum wall thickness, traces the position coordinates corresponding to the maximum wall thickness and the minimum wall thickness, records the position coordinates in the control system, and explicitly marks, on the pipe, the positions corresponding to the maximum and minimum wall thickness on the two ends respectively. When the tensioning mechanisms on two ends of the pipe end face pre-treatment subsystem are driven to rotate again by the control system and stops, the current welding end faces of a current pipe and a previous pipe are fitted according to a principle that the area coincidence is maximal.

The pipe supporting subsystem is used for supporting a pipe placed in a trench. The pipe supporting subsystem includes a middle supporting assembly 7 for holding up the central portion of a pipe and a lifting hook assembly 8 capable of moving up and down and used for being locked and fixed at a front end of the pipe. The middle supporting assembly 7 is retractably mounted on the central portion of a base plate 806 of the platform. An upper end of the lifting hook assembly 8 is connected to the base plate 806 of the platform through a sliding mechanism 807, and a lower end of the lifting hook assembly 8 is provided with a clamping block 801 which is capable of being inserted in an inner hole of the pipe 808 and locking the pipe. A telescopic rod 809 is arranged between the sliding mechanism 807 and the clamping block 801, and is further provided with a first photographing and measuring device for checking the posture of a current pipe. The measurement data obtained by the first photographing and measuring device is sent by the on-line measurement subsystem to the control system. The control system controls and drives the lifting hook assembly 8 to move in the X-direction and Z-direction, and finely adjusts the posture of the current pipe till it conforms to the pipeline laying specification.

The welding and welding quality inspection subsystem 5 is retractably mounted at a rear end of the base plate 806 of the platform and is used for welding joint parts between a current pipe and a previous pipe. The welding and welding quality inspection subsystem 5 includes a welding assembly A 501 and a welding assembly B 502 which are both of an annular structure. Multiple rolling supports 503 are provided along an inner circumference of the welding assembly A 501 and the welding assembly B 502 respectively. Rollers and a first electromagnetic sucker 504 for attaching to a pipe are mounted on the bottom of each rolling support 503. The welding assembly A 501 is provided with an annular guide-rail device 505, multiple welding machine travelling mechanisms 506 are mounted on the annular guide-rail device 505, and each welding machine travelling mechanism 506 is provided with a welding gun 507 for welding joint parts of a current pipe and a previous pipe and a nondestructive testing monitoring device 508 for checking a welding seam. The welding assembly A 501 is further provided with multiple telescopic pull rods 509. An oval structure 521 is fixed on an outer end of each pull rod 509 and is extended and inserted into a slot 522 of a corresponding shape on the welding assembly B 502. The pull rod is then rotated by 90° to make the oval structure 521 on the pull rod 509 and the slot 522 on the welding assembly B 502 cross each other. After that, the pull rod is retracted and locked, to fixedly connect the welding assembly A 501 and the welding assembly B 502. The welding assembly B 502 is further provided with a second photographing and measuring device 510 for determining positions of the welding assembly B and a pipe. The measurement data obtained by the second photographing and measuring device 510 is sent by the on-line measurement subsystem to the control system. The control system controls the welding assembly B 502 to lock the pipe.

The control system is used for controlling operation of the entire robot.

The number of the crawler belts 6 is two and the two crawler belts 6 are respectively arranged at two sides of the bottom of the platform 1001.

The number of the crawler belts 6 is four and the four crawler belts 6 are respectively arranged at four corners of the bottom of the platform 1001. The platform is capable of moving up and down relative to the four crawler belts 6, and each crawler belt 6 is capable of being steered.

The platform is further provided with a residential room 9 capable of moving up and down.

The navigation subsystem 1002 adopts the BeiDou navigation system, GPS navigation system, GLONASS navigation system, or Galileo navigation system.

Each telescopic device 302 is provided with a detector for detecting a pipe, thereby enabling the two grippers 303 to accurately grab a pipe.

Each tensioning mechanism includes a jig frame 403, a rotating expander sleeve 405 fitted outside the jig frame 403 through rolling bearings 404, multiple tapered tensioning blocks 407 circumferentially and fixedly connected at an end portion of the rotating expander sleeve 405 through an elastic tensioning arm 406 respectively, and a tapered plug 408 which is matched with the tapered tensioning blocks 407 for use and is used for raising the tapered tensioning blocks 407 in a tensioning manner. The jig frame 403 is connected to an output end of a power cylinder through supporting guide columns 409, to realize extension and retraction of the jig frame 403. A bull gear 410 is arranged outside the rotating expander sleeve 405 and is meshed with a gear at an output end of a motor, to enable the rotating expander sleeve 405 to rotate relative to the jig frame 403 and drive the pipe to rotate. The central portion of the tapered plug 408 is rotatably connected to an oil cylinder output rod 411 through a thrust bearing. The tapered plug 408 is driven by the oil cylinder output rod 411 to perform extending and retracting movement, such that the tapered tensioning blocks 407 are raised in a tensioning manner and are reset.

A carrier block is provided on the bottom of the middle supporting assembly 7. A semicircular groove fitted with the pipe is formed on an upper portion of the carrier block, and a travelling wheel is provided on a lower portion of the carrier block. A connecting rod is vertically and fixedly connected at two sides of the carrier block respectively. Upper ends of the two connecting rods are respectively hinged to the base plate 806 of the platform, and upper portions of the two connecting rods are further respectively connected to the base plate 806 of the platform through a cylinder, to realize extension and retraction of the middle supporting assembly 7.

A vertical rod is vertically and fixedly connected at two sides of the welding assembly A 501 respectively. Upper ends of the two vertical rods are respectively hinged to the base plate 806 of the platform, and upper portions of the two vertical rods are further respectively connected to the base plate 806 of the platform through a cylinder, to realize extension and retraction of the welding and welding quality inspection subsystem 5. A rotating wheel is further provided on the bottom of the welding assembly A 501.

An operating method for automatic continuous laying of pipelines by using the automatic continuous operation robot for laying large-diameter pipelines includes the following steps:

1) enabling the robot to move to an excavated earthwork plane, performing accurate initial positioning according to the navigation subsystem 1002, then extending the telescopic supporting arms, and retracting the crawler belts 6;

2) firstly stretching out the middle supporting assembly 7 and the welding and welding quality inspection subsystem 5 on the robot platform till they are perpendicular to the platform plane; detecting, by the detector in the pipe grabbing and conveying subsystem 3 on the main frame 1, the position of a pipe and feeding back the detected position to the control system; driving, by the control system, the two grippers 303 of the pipe grabbing and conveying subsystem 3 to grab the pipe and automatically lift and laterally convey the pipe to a specified position of the pipe end face pre-treatment subsystem 4 on the robot platform under the control of the control system;

3) positioning, by the two tensioning mechanisms 490 in the pipe end face pre-treatment subsystem 4, two end faces of the pipe in a tensioning manner at the same time, retracting the two grippers 303, and holding up the pipe by the supporting wheels 402 on the platform to keep the horizontal deflection of the pipe being 0, then performing milling and turning of planes and grooves and grinding of edges and burrs, and retracting the supporting wheels 402 on the platform after the end face treatment is completed;

4) when the pipe end face pre-treatment subsystem 4 is dealing with the pipe, measuring, by the on-line measurement subsystem, the end face sizes of the pipe to respectively obtain the maximum diameter and the minimum diameter of the two ends, marking the numerical values of the maximum and minimum diameters of the two ends and the positions thereof, and meanwhile recording and storing the accurate position coordinates in the control system;

5) grabbing the pipe again by the two grippers 303 in the pipe grabbing and conveying subsystem 3, retracting the two tensioning mechanisms 490 in the pipe end face pre-treatment subsystem 4, and vertically conveying, by the two grippers 303, the pipe to a horizontal pipe welding position in an underground trench; then enabling the pipe to move horizontally in a Z-direction, such that a welding end face C of the pipe passes through an inner hole of the welding assembly B 502 in the welding and welding quality inspection subsystem 5; inserting the lifting hook assembly 8 into an inner hole of the pipe 808 from a welding end face D of the pipe and locking the lifting hook assembly 8 to the welding end face D to support the pipe; releasing, retracting, and resetting the two grippers 303 in the pipe grabbing and conveying subsystem 3; measuring, by the first photographing and measuring device 802, the posture of the pipe and feeding back, by the on-line measurement subsystem, the measurement result to the control system; driving, by the control system, the lifting hook assembly 8 according to a system-specified posture; after the lifting hook assembly 8 adjusts the horizontal posture of the pipe and accurately positions the pipe, backfilling earthworks into the trench by using a backfilling device, the earthwork backfilling achieving a supporting effect; retracting the telescopic supporting arms by the robot platform, enabling the robot platform to move in the Z-direction along the pipe wall, and enabling the welding and welding quality inspection subsystem 5 to continuously move with the robot platform; when the robot platform approaches the welding end face D of the pipe, releasing and retracting the lifting hook assembly 8, and when the robot platform reaches a system-specified welding position on the welding end face D of the pipe, removing the welding assembly B 502 from the pipe, locking the welding assembly A 501 on the pipe, and positioning the pipe by the welding assembly A 501;

6) grabbing, by the two grippers 303 in the pipe grabbing and conveying subsystem 3 on the main frame 1, a current pipe at a pre-determined position, and automatically lifting and laterally conveying the pipe to a specified position of the pipe end face pre-treatment subsystem 4 on the robot platform under the control of the control system;

7) repeating Step 3) and Step 4);

8) retrieving, by the on-line measurement subsystem, size information of the welding end face D of the previous pipe, comparing and matching the size information with data about the welding end face C of the current pipe, and adjusting the angle of the current pipe according to a principle that the area coincidence is maximal;

9) vertically conveying, by the pipe grabbing and conveying subsystem 3, the current pipe to an underground horizontal pipe welding position; then driving the current pipe to move horizontally in the Z-direction, such that the welding end face C of the current pipe passes through the inner hole of the welding assembly B 502 and coincides with an axis of the welding assembly A 501; when the distance from the welding assembly B 502 to the current welding end face of the current pipe meets the requirement of the control system, locking and fixing the welding assembly B 502 with the current pipe; and performing horizontal movement in the Z-direction by the current pipe under the effect of the telescopic pull rods 509 on the welding assembly A 501, such that the current pipe contacts the welding end face D of the previous pipe and is then locked, enabling the welding assembly A 501 to be fixedly connected with the welding assembly B 502 which is fixed to the current pipe;

10) driving, by the control system, the lifting hook assembly 8 to be locked and fixed with the welding end face D of the current pipe;

11) driving, by the control system, the middle supporting assembly 7 to hold up the central portion of the current pipe;

12) adjusting, by the control system, the posture of the current pipe;

13) fixing, by the welding and welding quality inspection subsystem 5, the two pipes through symmetrical spot welding, where four welding guns on the welding assembly A 501 start welding from four symmetrical spots at the same time and an entire welding seam is accumulated by at least three layers, each welding gun is responsible for welding ¼ of a circumference on the same welding layer, and when a second layer is to be welded, the four welding guns are all raised by the height of one welding layer in real time before welding a next ¼ of a circumference, and the rest is deduced in the same manner till the welding demand is satisfied;

14) performing nondestructive testing on the welding seam by the nondestructive testing monitoring device 508, generating an alarm on site when a flaw is detected, marking the flaw, and feeding back the result to the control system for storage and printout, where the defect is compensated by the control system;

15) unlocking and releasing the welding assembly A 501 and the welding assembly B 502 from the previous pipe, rotating and unlocking the pull rods 509, and hanging the welding assembly B 502 on the pull rods 509;

16) retracting the telescopic supporting arms and extending the crawler belts 6 by the robot platform, ensuring that a reference point for Y coordinates of the platform stays unchanged; enabling the robot platform to move in the Z-direction along the current pipe wall; backfilling earthworks by the backfilling device afterwards, the earthwork backfilling achieving a supporting effect; enabling the welding and welding quality inspection subsystem 5 to continuously move with the robot platform; when the robot platform approaches the welding end face D of the current pipe, releasing and retracting the lifting hook assembly 8, and when the robot platform moves to a system-specified welding position on the welding end face D of the current pipe, removing the welding assembly B 502 from the current pipe, and positioning the current pipe by the welding assembly A 501;

17) enabling the robot platform to advance along a path excavated by an earthwork excavation device and pause at one unit pipe length, and then extending the telescopic supporting arms and retracting the crawler belts 6;

18) continuously excavating a trench of one unit pipe length by the excavation device; and 19) cyclically performing Step 6) to Step 18).

Embodiment

Large-diameter oil pipelines are to be continuously laid outdoors, and each pipeline has a diameter of 1.6 m, a length of 12 m, a wall thickness of 14 mm, and a net weight of over 5000 kg. The pipelines and the robot platform as well as its operating accessories provided by the present invention are delivered by large transport vehicles under the guide of the GPS, BeiDou, GLONASS, or Galileo navigation system and are unloaded at a specified site according to an operation specification.

An outdoor all-weather long-term life support subsystem (residential room) for operators is located on the top of the main frame 1 during operation and can be lowered to the inner space of the main frame 1 for convenience during transfer. Besides, the crawler belts 6 are mounted on telescopic steel beams, and extend out during operation to respectively move along two sides of a trench. The four crawler belts 6 can each be automatically adjusted upward or downward and steered along with the terrain during operation, to keep the robot platform in a horizontal plane. During transportation, the crawler belts 6 are retracted, which facilitates the transportation of the entire robot platform. The welding and welding quality inspection subsystem 5 on the robot platform is located at a position underground and on the bottom of platform during operation, and is folded inside the platform during transfer, such that the overall size of the robot platform to be transported is reduced.

An excavator starts excavating a trench with a width not less than 2.5 m, a depth not less than 2.3 m, and a length not less than 24 m under the guide of the navigation system at an operation site with the accuracy not less than 0.1 m.

The robot platform extends the crawler belts 6 and moves to the starting side of the trench. The navigation subsystem 1002 on the robot platform calibrates the position of the platform. An electrical control system instructs a pneumatic system to drive a cylinder such that the welding and welding quality inspection subsystem 5 stretches out to reach an operation position perpendicular to the ground. The robot platform extends the telescopic supporting arms and retracts the crawler belts 6. In this way, the platform is suspended under the support of the telescopic supporting arms, and the position of the platform is stored in the system as a reference point for coordinates of the system.

The excavation system continuously works, and a trench of 12 m long needs to be excavated within 0.5 h.

The measurement system on the robot platform measures the position of the current pipe, and feeds back the current three-dimensional coordinates of the current pipe to the control system. The control system horizontally drives the main frame 1 to move on the robot platform according to Z-axis coordinates, and adjusts to achieve optimal relative positions between the main frame 1 and the pipe. The control system drives two crossbeams (the mechanical arms 301) in the X-direction (a horizontal direction perpendicular to the length direction of the platform) and two vertical arms (the telescopic devices 302) in the Y-direction (a vertical direction) of a mechanical arm assembly (the pipe grabbing and conveying subsystem 3) to reach corresponding positions of X, Y coordinates of the pipe. A grabbing mechanism (the gripper 303) is hinged to a lower end of each vertical arm, and is driven by the control system to lock the current pipe. The main frame 1 is horizontally driven by the control system to move in the Z-direction, and the mechanical arm assembly is driven by the control system to move in the X-direction and the Y-direction, thus delivering the current pipe to the position of the pipe end face pre-treatment subsystem 4 in the robot platform. The axis of the current pipe coincides with a central connection line of clamping mechanisms on two ends of the pipe end face pre-treatment subsystem 4. The clamping mechanisms on two ends of the pipe end face pre-treatment subsystem 4 are forced into inner holes 492 on two ends of the current pipe for fixing the pipe in a tensioning manner. To reduce the vibration caused by rotation of the pipe and reduce influences thereof on end face treatment and welding, the supporting wheels 402 on the platform hold up the pipe, and the deflection of the current pipe is 0. The mechanical arm assembly is released, retracted, and reset. The clamping mechanisms on two ends of the pipe end face pre-treatment subsystem 4 rotate synchronously at the same time, and the four cutters distributed outside each clamping mechanism rotate at the same time. Firstly, two symmetrically distributed milling cutters perform turning-milling combined machining on each end face of the current pipe at the same time. During the last stage of the turning-milling combined machining, grinding wheels are used to grind burrs produced in this stage. Therefore, the turning, milling, and grinding are nearly completed at the same time, and the planes and grooves of the two end faces meet the welding process requirements. During end face pre-treatment of the current pipe, the on-line measurement subsystem measures synchronously to obtain geometric sizes and position coordinates of each end face of the current pipe. When pre-treatment of the two end faces of the current pipe is completed, the measurement is completed at the same time. The control system analyzes the measurement data, screens out size data about the maximum wall thickness and the minimum wall thickness, traces the position coordinates corresponding to the maximum wall thickness and the minimum wall thickness, records the position coordinates in the control system, and explicitly marks, on the current pipe, the positions corresponding to the maximum and minimum wall thickness on the two ends respectively. The control system views the maximum and minimum wall thickness and the X, Y position coordinates corresponding to the same of the welding end face D of the previous pipe, and drives the clamping mechanisms on two ends of the pipe end face pre-treatment subsystem 4 to rotate. The rotating angle is adapted according to a principle that the area coincidence between the welding end face C of the current pipe and the neighboring welding end face D of the previous pipe is maximal. After the fitting is completed, the control system drives the mechanical arm assembly to lock the current pipe, and the supporting wheels 402 and the clamping mechanisms are released, retracted, and reset.

The control system drives the mechanical arm assembly to descend in the Y-direction, and horizontally drives the main frame to move in the Z-direction and drives the mechanical arm assembly to move in the X-direction for fine adjustment, to place the current pipe on an extending line of the axis of the previous pipe. Then, the control system horizontally drives the main frame 1 to move in the Z-direction, such that the current pipe passes through an inner hole of the welding assembly B, and the distance from the welding end face C of the current pipe to the end of the welding assembly B meets the requirement of the operation specification. After that, the welding assembly B is locked and fixed to the current pipe, the system horizontally drives the lifting hook assembly 8 to be locked and fixed to the welding end face D of the current pipe, the middle supporting assembly 7 holds up the current pipe at its central portion, and the mechanical arm assembly is released, retracted, and reset. The control system drives the end of the welding assembly A to extend the pull rods, and the pull rods are inserted into the corresponding slots 522 at the end of the welding assembly B. The control system drives the pull rods to rotate by 90° so as to be fixed with the end of the welding assembly B and then retracts the pull rods, such that the welding end face C of the current pipe contacts and is fixed to the welding end face D of the previous pipe. The control system checks whether the posture of the current pipe conforms to the pipeline laying specification, drives the lifting hook assembly 8 on the welding end face D of the current pipe to move in the X-direction and Z-direction, and finely adjusts the posture of the current pipe to meet the requirement. The control system drives the welding guns distributed at four symmetrical positions to fix the two end faces through spot welding. The control system drives the two ends of the welding assemblies A and B to be unlocked, and the pull rods on the welding assembly A are rotated by 90° and are retracted and reset. The control system drives the four uniformly and symmetrically distributed welding guns on the end of the welding assembly A to respectively start welding from four quadrant points at the same time. Each welding gun welds ¼ of a circumference on each welding layer, and then the control system drives the welding gun to rise by the height of one welding layer along the radial direction of the pipe and continuously weld ¼ of a circumference on the welding layer made by the previous welding gun. In this way, the welding is completed. The entire welding seam is accumulated by at least three welding layers, and no defect is allowed between the welding layers. After the welding is completed, the control system drives a nondestructive testing system (the optical ultrasonic monitoring device 508) on the welding assembly A to check the welding seam, generate an alarm when a flaw is detected on the welding seam, and mark the flaw on site, and the control system stores and prints out the record. After the welding process is completed, the control system drives the two ends of the welding assemblies A and B to be respectively unlocked and released from the current pipe.

The robot platform retracts the telescopic supporting arms and extends the crawler belts 6, ensuring that a reference point for Y coordinates of the platform stays unchanged. The robot platform moves by about 12 m along a trench excavated by the excavation system, and meanwhile the welding assemblies also move correspondingly with the robot platform to reach a next welding position specified by the system. The control system drives the lifting hook assembly, which is capable of moving up and down, to be unlocked and removed from the current pipe.

When the robot platform advances in the Z-direction, the earthwork backfilling system gradually backfills earthworks into the trench and tamps the earthworks, to provide support to the current pipe.

After reaching a new position specified by the system, the robot platform extends the telescopic supporting arms, retracts the crawler belts 6, and locks and fixes the end of the welding assembly A to the welding end face D of the current pipe.

The above process needs to be completed within 0.5 h, and the cycle continues till the project ends.

During pipeline construction, the constructors can live, rest, dine, and entertain in the residential room, on the top of the robot platform, which is provided by the outdoor all-weather long-term life support subsystem for operators.

In view of the above, the content of the present invention is not limited to the above embodiment. Persons skilled in the art can think of other embodiments in accordance with the technical guidance of the present invention, and all these embodiments shall fall within the scope of the present invention.

What is claimed is:

1. An automatic continuous operation robot for laying large-diameter pipelines, comprising a platform, a main frame (1), an operation room, a navigation subsystem (1002), a pipe grabbing and conveying subsystem (3), a pipe end face pre-treatment subsystem (4), an on-line measurement subsystem, a pipe supporting subsystem, a welding and welding quality inspection subsystem (5), and a control system, wherein the bottom of the platform (1001) is provided with crawler belts (6) for movement;
the main frame (1) is capable of moving horizontally in a Z-direction relative to the platform;
the operation room is arranged on the platform;
the navigation subsystem (1002) is used for preliminarily positioning a construction site, to ensure that the entire robot travels to the construction site;
the pipe grabbing and conveying subsystem (3) is used for grabbing a pipe and conveying the pipe into a trench; the pipe grabbing and conveying subsystem (3) comprises two mechanical arms (301) which are mounted on the main frame (1) and are capable of moving horizontally in an X-direction, two telescopic devices (302) respectively mounted on end portions of the two mechanical arms (301), and two grippers (303) for grabbing a pipe, the two grippers (303) being respectively mounted on output ends of the two telescopic devices (302) and capable of moving vertically in a Y-direction;

the pipe end face pre-treatment subsystem (4) is used for performing groove machining on two ends of a pipe; the pipe end face pre-treatment subsystem (4) comprises two tensioning mechanisms (490) which are capable of rotating independently, symmetrically mounted on the platform, and used for fixing a pipe; multiple cutters (491) which are rotatably mounted on the two tensioning mechanisms (490) and are used for performing groove machining on two ends of a pipe; and multiple supporting wheels (402) which are retractably mounted on the platform and used for holding up a pipe; the two tensioning mechanisms (490) are capable of relatively extending and retracting, and are inserted in inner holes (492) on two ends of a pipe for fixing the pipe in a tensioning manner; the pipe is forced to rotate along with the rotation of the two tensioning mechanisms (490); when the end face pre-treatment subsystem is dealing with two end faces of a pipe, the on-line measurement subsystem measures synchronously to obtain geometric sizes and position coordinates of each end face of the pipe, and sends the measurement data to the control system; the control system analyzes the final measurement data, screens out size data about the maximum wall thickness and the minimum wall thickness, traces the position coordinates corresponding to the maximum wall thickness and the minimum wall thickness, records the position coordinates in the control system, and explicitly marks, on the pipe, the positions corresponding to the maximum and minimum wall thickness on the two ends respectively; when the tensioning mechanisms on two ends of the pipe end face pre-treatment subsystem are driven to rotate again by the control system and stops, the current welding end faces of a current pipe and a previous pipe are fitted according to a principle that the area coincidence is maximal;

the pipe supporting subsystem is used for supporting a pipe placed in a trench; the pipe supporting subsystem comprises a middle supporting assembly (7) for holding up the central portion of a pipe and a lifting hook assembly (8) capable of moving up and down and used for being locked and fixed at a front end of the pipe; the middle supporting assembly (7) is retractably mounted on the central portion of a base plate (806) of the platform; an upper end of the lifting hook assembly (8) is connected to the base plate (806) of the platform through a sliding mechanism (807), and a lower end of the lifting hook assembly (8) is provided with a clamping block (801) which is capable of being inserted in an inner hole of the pipe (808) and locking the pipe; a telescopic rod (809) is arranged between the sliding mechanism (807) and the clamping block (801), and is further provided with a first photographing and measuring device for checking the posture of a current pipe; the measurement data obtained by the first photographing and measuring device is sent by the on-line measurement subsystem to the control system; the control system controls and drives the lifting hook assembly (8) to move in the X-direction and Z-direction, and finely adjusts the posture of the current pipe till it conforms to the pipeline laying specification;

the welding and welding quality inspection subsystem (5) is retractably mounted at a rear end of the base plate (806) of the platform and is used for welding joint parts between a current pipe and a previous pipe; the welding and welding quality inspection subsystem (5) comprises a welding assembly A (501) and a welding assembly B (502) which are both of an annular structure; multiple rolling supports (503) are provided along an inner circumference of the welding assembly A (501) and the welding assembly B (502) respectively; rollers and a first electromagnetic sucker (504) for attaching to a pipe are mounted on the bottom of each rolling support (503); the welding assembly A (501) is provided with an annular guide-rail device (505), multiple welding machine travelling mechanisms (506) are mounted on the annular guide-rail device (505), and each welding machine travelling mechanism (506) is provided with a welding gun (507) for welding joint parts of a current pipe and a previous pipe and a nondestructive testing monitoring device (508) for checking a welding seam; the welding assembly A (501) is further provided with multiple telescopic pull rods (509); an oval structure (521) is fixed on an outer end of each pull rod (509) and is extended and inserted into a slot (522) of a corresponding shape on the welding assembly B (502); the pull rod is then rotated by 90° to make the oval structure (521) on the pull rod (509) and the slot (522) on the welding assembly B (502) cross each other; after that, the pull rod is retracted and locked, to fixedly connect the welding assembly A (501) and the welding assembly B (502); the welding assembly B (502) is further provided with a second photographing and measuring device (510) for determining positions of the welding assembly B and a pipe; the measurement data obtained by the second photographing and measuring device (510) is sent by the on-line measurement subsystem to the control system; and the control system controls the welding assembly B (502) to lock the pipe;

the control system is used for controlling operation of the entire robot.

2. The automatic continuous operation robot for laying large-diameter pipelines according to claim 1, wherein the number of the crawler belts (6) is two and the two crawler belts (6) are respectively arranged at two sides of the bottom of the platform (1001).

3. The automatic continuous operation robot for laying large-diameter pipelines according to claim 2, wherein the number of the crawler belts (6) is two and the two crawler belts (6) are respectively arranged at two sides of the bottom of the platform (1001).

4. The operating method using the automatic continuous operation robot for laying large-diameter pipelines according to claim 3, wherein the number of the crawler belts (6) is four and the four crawler belts (6) are respectively arranged at four corners of the bottom of the platform (1001); the platform is capable of moving up and down relative to the four crawler belts (6), and each crawler belt (6) is capable of being steered.

5. The automatic continuous operation robot for laying large-diameter pipelines according to claim 1, wherein the number of the crawler belts (6) is four and the four crawler belts (6) are respectively arranged at four corners of the bottom of the platform (1001); the platform is capable of moving up and down relative to the four crawler belts (6), and each crawler belt (6) is capable of being steered.

6. The automatic continuous operation robot for laying large-diameter pipelines according to claim 5, wherein the number of the crawler belts (6) is four and the four crawler belts (6) are respectively arranged at four corners of the bottom of the platform (1001); the platform is capable of moving up and down relative to the four crawler belts (6), and each crawler belt (6) is capable of being steered.

7. The operating method using the automatic continuous operation robot for laying large-diameter pipelines according to claim 6, wherein the platform is further provided with a residential room (9) capable of moving up and down.

8. The automatic continuous operation robot for laying large-diameter pipelines according to claim 1, wherein the platform is further provided with a residential room (9) capable of moving up and down.

9. The automatic continuous operation robot for laying large-diameter pipelines according to claim 8, wherein the platform is further provided with a residential room (9) capable of moving up and down.

10. The operating method using the automatic continuous operation robot for laying large-diameter pipelines according to claim 9, wherein the navigation subsystem (1002) adopts the BeiDou navigation system, GPS navigation system, GLONASS navigation system, or Galileo navigation system.

11. The automatic continuous operation robot for laying large-diameter pipelines according to claim 1, wherein the navigation subsystem (1002) adopts the BeiDou navigation system, GPS navigation system, GLONASS navigation system, or Galileo navigation system.

12. The automatic continuous operation robot for laying large-diameter pipelines according to claim 11, wherein the navigation subsystem (1002) adopts the BeiDou navigation system, GPS navigation system, GLONASS navigation system, or Galileo navigation system.

13. The operating method using the automatic continuous operation robot for laying large-diameter pipelines according to claim 12, wherein each telescopic device (302) is provided with a detector for detecting a pipe, thereby enabling the two grippers (303) to accurately grab a pipe.

14. The automatic continuous operation robot for laying large-diameter pipelines according to claim 1, wherein each telescopic device (302) is provided with a detector for detecting a pipe, thereby enabling the two grippers (303) to accurately grab a pipe.

15. The automatic continuous operation robot for laying large-diameter pipelines according to claim 14, wherein each telescopic device (302) is provided with a detector for detecting a pipe, thereby enabling the two grippers (303) to accurately grab a pipe.

16. The operating method using the automatic continuous operation robot for laying large-diameter pipelines according to claim 15, wherein each tensioning mechanism comprises a jig frame (403), a rotating expander sleeve (405) fitted outside the jig frame (403) through rolling bearings (404), multiple tapered tensioning blocks (407) circumferentially and fixedly connected at an end portion of the rotating expander sleeve (405) through an elastic tensioning arm (406) respectively, and a tapered plug (408) which is matched with the tapered tensioning blocks (407) for use and is used for raising the tapered tensioning blocks (407) in a tensioning manner; the jig frame (403) is connected to an output end of a power cylinder through supporting guide columns (409), to realize extension and retraction of the jig frame (403); a bull gear (410) is arranged outside the rotating expander sleeve (405) and is meshed with a gear at an output end of a motor, to enable the rotating expander sleeve (405) to rotate relative to the jig frame (403) and drive the pipe to rotate; the central portion of the tapered plug (408) is rotatably connected to an oil cylinder output rod (411) through a thrust bearing; and the tapered plug (408) is driven by the oil cylinder output rod (411) to perform extending and retracting movement, such that the tapered tensioning blocks (407) are raised in a tensioning manner and are reset.

17. The automatic continuous operation robot for laying large-diameter pipelines according to claim 1, wherein each tensioning mechanism comprises a jig frame (403), a rotating expander sleeve (405) fitted outside the jig frame (403) through rolling bearings (404), multiple tapered tensioning blocks (407) circumferentially and fixedly connected at an end portion of the rotating expander sleeve (405) through an elastic tensioning arm (406) respectively, and a tapered plug (408) which is matched with the tapered tensioning blocks (407) for use and is used for raising the tapered tensioning blocks (407) in a tensioning manner; the jig frame (403) is connected to an output end of a power cylinder through supporting guide columns (409), to realize extension and retraction of the jig frame (403); a bull gear (410) is arranged outside the rotating expander sleeve (405) and is meshed with a gear at an output end of a motor, to enable the rotating expander sleeve (405) to rotate relative to the jig frame (403) and drive the pipe to rotate; the central portion of the tapered plug (408) is rotatably connected to an oil cylinder output rod (411) through a thrust bearing; and the tapered plug (408) is driven by the oil cylinder output rod (411) to perform extending and retracting movement, such that the tapered tensioning blocks (407) are raised in a tensioning manner and are reset.

18. The automatic continuous operation robot for laying large-diameter pipelines according to claim 17, wherein each tensioning mechanism comprises a jig frame (403), a rotating expander sleeve (405) fitted outside the jig frame (403) through rolling bearings (404), multiple tapered tensioning blocks (407) circumferentially and fixedly connected at an end portion of the rotating expander sleeve (405) through an elastic tensioning arm (406) respectively, and a tapered plug (408) which is matched with the tapered tensioning blocks (407) for use and is used for raising the tapered tensioning blocks (407) in a tensioning manner; the jig frame (403) is connected to an output end of a power cylinder through supporting guide columns (409), to realize extension and retraction of the jig frame (403); a bull gear (410) is arranged outside the rotating expander sleeve (405) and is meshed with a gear at an output end of a motor, to enable the rotating expander sleeve (405) to rotate relative to the jig frame (403) and drive the pipe to rotate; the central portion of the tapered plug (408) is rotatably connected to an oil cylinder output rod (411) through a thrust bearing; and the tapered plug (408) is driven by the oil cylinder output rod (411) to perform extending and retracting movement, such that the tapered tensioning blocks (407) are raised in a tensioning manner and are reset.

19. The operating method using the automatic continuous operation robot for laying large-diameter pipelines according to claim 18, wherein a carrier block is provided on the bottom of the middle supporting assembly (7); a semicircular groove fitted with the pipe is formed on an upper portion of the carrier block, and a travelling wheel is provided on a lower portion of the carrier block; a connecting rod is vertically and fixedly connected at two sides of the carrier block respectively; upper ends of the two connecting rods are respectively hinged to the base plate (806) of the platform, and upper portions of the two connecting rods are further respectively connected to the base plate (806) of the platform through a cylinder, to realize extension and retraction of the middle supporting assembly (7).

20. The automatic continuous operation robot for laying large-diameter pipelines according to claim 1, wherein a carrier block is provided on the bottom of the middle supporting assembly (7); a semicircular groove fitted with the pipe is formed on an upper portion of the carrier block, and a travelling wheel is provided on a lower portion of the carrier block; a connecting rod is vertically and fixedly connected at two sides of the carrier block respectively; upper ends of the two connecting rods are respectively hinged to the base plate (806) of the platform, and upper portions of the two connecting rods are further respectively connected to the base plate (806) of the platform through a cylinder, to realize extension and retraction of the middle supporting assembly (7).

21. The automatic continuous operation robot for laying large-diameter pipelines according to claim 20, wherein a carrier block is provided on the bottom of the middle supporting assembly (7); a semicircular groove fitted with the pipe is formed on an upper portion of the carrier block, and a travelling wheel is provided on a lower portion of the carrier block; a connecting rod is vertically and fixedly connected at two sides of the carrier block respectively; upper ends of the two connecting rods are respectively hinged to the base plate (806) of the platform, and upper portions of the two connecting rods are further respectively connected to the base plate (806) of the platform through a cylinder, to realize extension and retraction of the middle supporting assembly (7).

22. The automatic continuous operation robot for laying large-diameter pipelines according to claim 1, wherein a vertical rod is vertically and fixedly connected at two sides of the welding assembly A (501) respectively; upper ends of the two vertical rods are respectively hinged to the base plate (806) of the platform, and upper portions of the two vertical rods are further respectively connected to the base plate (806) of the platform through a cylinder, to realize extension and retraction of the welding and welding quality inspection subsystem (5); and a rotating wheel is further provided on the bottom of the welding assembly A (501).

23. An operating method using the automatic continuous operation robot for laying large-diameter pipelines according to claim 22, comprising the following steps:
1) enabling the robot to move to an excavated earthwork plane, performing accurate initial positioning according to the navigation subsystem (1002), then extending the telescopic supporting arms, and retracting the crawler belts (6);
2) firstly stretching out the middle supporting assembly (7) and the welding and welding quality inspection subsystem (5) on the robot frame till they are perpendicular to the platform plane; detecting, by the detector in the pipe grabbing and conveying subsystem (3) on the main frame (1), the position of a pipe and feeding back the detected position to the control system; driving, by the control system, the two grippers (303) of the pipe grabbing and conveying subsystem (3) to grab the pipe and automatically lift and laterally convey the pipe to a specified position of the pipe end face pre-treatment subsystem (4) on the robot platform under the control of the control system;
3) positioning, by the two tensioning mechanisms (490) in the pipe end face pre-treatment subsystem (4), two end faces of the pipe in a tensioning manner at the same time, retracting the two grippers (303), and holding up the pipe by the supporting wheels (402) on the platform to keep the horizontal deflection of the pipe being 0, then performing milling and turning of planes and grooves and grinding of edges and burrs, and retracting the supporting wheels (402) on the platform after the end face treatment is completed;

4) when the pipe end face pre-treatment subsystem (4) is dealing with the pipe, measuring, by the on-line measurement subsystem, the end face sizes of the pipe to respectively obtain the maximum diameter and the minimum diameter of the two ends, marking the numerical values of the maximum and minimum diameters of the two ends and the positions thereof, and meanwhile recording and storing the accurate position coordinates in the control system;

5) grabbing the pipe again by the two grippers (303) in the pipe grabbing and conveying subsystem (3), retracting the two tensioning mechanisms (490) in the pipe end face pre-treatment subsystem (4), and vertically conveying, by the two grippers (303), the pipe to a horizontal pipe welding position in an underground trench; then enabling the pipe to move horizontally in a Z-direction, such that a welding end face C of the pipe passes through an inner hole of the welding assembly B (502) in the welding and welding quality inspection subsystem (5); inserting the lifting hook assembly (8) into an inner hole of the pipe (808) from a welding end face D of the pipe and locking the lifting hook assembly (8) to the welding end face D to support the pipe; releasing, retracting, and resetting the two grippers (303) in the pipe grabbing and conveying subsystem (3); measuring, by the first photographing and measuring device (802), the posture of the pipe and feeding back, by the on-line measurement subsystem, the measurement result to the control system; driving, by the control system, the lifting hook assembly (8) according to a system-specified posture; after the lifting hook assembly (8) adjusts the horizontal posture of the pipe and accurately positions the pipe, backfilling earthworks into the trench by using a backfilling device, the earthwork backfilling achieving a supporting effect; retracting the telescopic supporting arms by the robot platform, enabling the robot platform to move in the Z-direction along the pipe wall, and enabling the welding and welding quality inspection subsystem (5) to continuously move with the robot platform; when the robot platform approaches the welding end face D of the pipe, releasing and retracting the lifting hook assembly (8), and when the robot platform reaches a system-specified welding position on the welding end face D of the pipe, removing the welding assembly B (502) from the pipe, locking the welding assembly A (501) on the pipe, and positioning the pipe by the welding assembly A (501);

6) grabbing, by the two grippers (303) in the pipe grabbing and conveying subsystem (3) on the main frame (1), a current pipe at a pre-determined position, and automatically lifting and laterally conveying the pipe to a specified position of the pipe end face pre-treatment subsystem (4) on the robot platform under the control of the control system;

7) repeating Step 3) and Step 4);

8) retrieving, by the on-line measurement subsystem, size information of the welding end face D of the previous pipe, comparing and matching the size information with data about the welding end face C of the current pipe, and adjusting the angle of the current pipe according to a principle that the area coincidence is maximal;

9) vertically conveying, by the pipe grabbing and conveying subsystem (3), the current pipe to an underground horizontal pipe welding position; then driving the current pipe to move horizontally in the Z-direction, such that the welding end face C of the current pipe passes through the inner hole of the welding assembly B (502) and coincides with an axis of the welding assembly A (501); when the distance from the welding assembly B (502) to the current welding end face of the current pipe meets the requirement of the control system, locking and fixing the welding assembly B (502) with the current pipe; and performing horizontal movement in the Z-direction by the current pipe under the effect of the telescopic pull rods (509) on the welding assembly A (501), such that the current pipe contacts the welding end face D of the previous pipe and is then locked, enabling the welding assembly A (501) to be fixedly connected with the welding assembly B (502) which is fixed to the current pipe;

10) driving, by the control system, the lifting hook assembly (8) to be locked and fixed with the welding end face D of the current pipe;

11) driving, by the control system, the middle supporting assembly (7) to hold up the central portion of the current pipe;

12) adjusting, by the control system, the posture of the current pipe;

13) fixing, by the welding and welding quality inspection subsystem (5), the two pipes through symmetrical spot welding, wherein four welding guns on the welding assembly A (501) start welding from four symmetrical spots at the same time and an entire welding seam is accumulated by at least three layers, each welding gun is responsible for welding ¼ of a circumference on the same welding layer, and when a second layer is to be welded, the four welding guns are all raised by the height of one welding layer in real time before welding a next ¼ of a circumference, and the rest is deduced in the same manner till the welding demand is satisfied;

14) performing nondestructive testing on the welding seam by the nondestructive testing monitoring device (508), generating an alarm on site when a flaw is detected, marking the flaw, and feeding back the result to the control system for storage and printout, wherein the defect is compensated by the control system;

15) unlocking and releasing the welding assembly A (501) and the welding assembly B (502) from the previous pipe, rotating and unlocking the pull rods (509), and hanging the welding assembly B (502) on the pull rods (509);

16) retracting the telescopic supporting arms and extending the crawler belts (6) by the robot platform, ensuring that a reference point for Y coordinates of the platform stays unchanged; enabling the robot platform to move in the Z-direction along the current pipe wall; backfilling earthworks by the backfilling device afterwards, the earthwork backfilling achieving a supporting effect; enabling the welding and welding quality inspection subsystem (5) to continuously move with the robot platform; when the robot platform approaches the welding end face D of the current pipe, releasing and retracting the lifting hook assembly (8), and when the robot platform moves to a system-specified welding position on the welding end face D of the current pipe, removing the welding assembly B (502) from the current pipe, and positioning the current pipe by the welding assembly A (501);

17) enabling the robot platform to advance along a path excavated by an earthwork excavation device and pause at one unit pipe length, and then extending the telescopic supporting arms and retracting the crawler belts (6);

18) continuously excavating a trench of one unit pipe length by the excavation device; and 19) cyclically performing Step 6) to Step 18).

24. The operating method using the automatic continuous operation robot for laying large-diameter pipelines according to claim 23, wherein the number of the crawler belts (6) is two and the two crawler belts (6) are respectively arranged at two sides of the bottom of the platform (1001).

* * * * *